(12) United States Patent
Kim et al.

(10) Patent No.: US 10,185,421 B2
(45) Date of Patent: Jan. 22, 2019

(54) TOUCH SENSOR EMBEDDED DISPLAY DEVICE AND METHOD FOR DRIVING THE SAME

(71) Applicant: LG Display Co., Ltd., Seoul (KR)

(72) Inventors: Younggyu Kim, Gyeonggi-do (KR); Byounggwan Lee, Gyeonggi-do (KR); Juhong Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 79 days.

(21) Appl. No.: 14/983,945

(22) Filed: Dec. 30, 2015

(65) Prior Publication Data

US 2017/0090630 A1    Mar. 30, 2017

(30) Foreign Application Priority Data

Sep. 30, 2015 (KR) .......................... 10-2015-0138259

(51) Int. Cl.
*G06F 3/041* (2006.01)
*G06F 3/047* (2006.01)
(Continued)

(52) U.S. Cl.
CPC ............ *G06F 3/0412* (2013.01); *G06F 3/044* (2013.01); *G06F 3/047* (2013.01); *G06F 3/0416* (2013.01);
(Continued)

(58) Field of Classification Search
None
See application file for complete search history.

(56) References Cited

U.S. PATENT DOCUMENTS

| 2007/0152951 A1* | 7/2007 | Ahn | ...................... G09G 3/342 345/102 |
| 2011/0141003 A1* | 6/2011 | Kim | ...................... G09G 3/342 345/102 |

(Continued)

FOREIGN PATENT DOCUMENTS

| CN | 103018994 A | 4/2013 |
| KR | 10-2014-0079689 A | 6/2014 |

(Continued)

OTHER PUBLICATIONS

Taiwanese Office Action dated Oct. 26, 2016, for Taiwanese Patent Application No. 104142979.

*Primary Examiner* — Stephen T Reed
(74) *Attorney, Agent, or Firm* — Morgan, Lewis & Bockius LLP

(57) ABSTRACT

Provided are a touch sensor embedded display device and a method for driving the same. A method includes: sequentially, in the display period: performing a display scan of a first area of the display panel based on one display line; and applying data of an input image to the pixels of the first area; simultaneously performing: a touch scan of a first touch line of the display panel and a touch scan of a second touch line of the display panel in a touch period following the display period; and simultaneously sensing touch inputs of the touch sensors on the first and second touch lines in the touch period, wherein each of the first and second touch lines overlaps a plurality of display lines, and wherein a width of each of the first and second touch lines is greater than a width of each of the plurality of display lines.

30 Claims, 27 Drawing Sheets

(51) Int. Cl.
*G09G 3/20* (2006.01)
*G06F 3/044* (2006.01)
*G09G 3/36* (2006.01)

(52) U.S. Cl.
CPC ......... *G09G 3/2096* (2013.01); *G09G 3/3648* (2013.01); *G09G 2354/00* (2013.01)

(56) References Cited

U.S. PATENT DOCUMENTS

| | | | |
|---|---|---|---|
| 2012/0169626 A1 | 7/2012 | Hsieh | |
| 2013/0082977 A1* | 4/2013 | Noguchi | G06F 3/0412 345/174 |
| 2014/0306906 A1* | 10/2014 | Huang | G06F 3/0418 345/173 |
| 2015/0042613 A1* | 2/2015 | Kim | G06F 3/044 345/174 |
| 2015/0286339 A1 | 10/2015 | Pyo et al. | |
| 2016/0147348 A1* | 5/2016 | Liu | G06F 3/0412 345/173 |

FOREIGN PATENT DOCUMENTS

| | | |
|---|---|---|
| TW | 201227452 A | 7/2012 |
| TW | I403939 B | 8/2013 |
| TW | 201413516 A | 4/2014 |
| TW | 201439864 A | 10/2014 |
| TW | I485587 B | 5/2015 |

\* cited by examiner

TOUCH SENSOR EMBEDDED DISPLAY DEVICE AND METHOD FOR DRIVING THE SAME

CROSS-REFERENCE TO RELATED APPLICATION(S)

This application claims the benefit of Korean Patent Application No. 10-2015-0138259, filed on Sep. 30, 2015, the entire disclosure of which is hereby incorporated by reference herein for all purposes.

BACKGROUND

1. Technical Field

The present disclosure relates to a touch sensor embedded display device, in which touch sensors are embedded in a pixel array, and a method for driving the same.

2. Discussion of the Related Art

User interfaces (UIs) are configured so that users are able to communicate with various electronic devices, and thus can easily and comfortably control the electronic devices as they desire. Examples of UIs include a keypad, a keyboard, a mouse, an on-screen display (OSD), and a remote controller having an infrared communication function or a radio frequency (RF) communication function. User interface technology has continuously expanded to increase user's sensibility and handling convenience. UIs have been recently developed to include touch UIs, voice recognition UIs, 3D UIs, and the like.

The touch UI has been adopted in portable information devices, such as smart phones, and use of the touch UI has been expanded to include notebook computers, computer monitors, and home appliances. A technology (hereinafter referred to as "in-cell touch sensor technology") has been recently proposed to embed touch sensors in a pixel array of a display panel. In the in-cell touch sensor technology, the touch sensors may be installed in the display panel without an increase in a thickness of the display panel.

In the in-cell touch sensor technology, electrodes connected to pixels of the display panel are used as electrodes of the touch sensors. For example, the in-cell touch sensor technology segments a common electrode supplying a common voltage to pixels of a liquid crystal display and uses segmented common electrode patterns as the electrodes of the touch sensors.

The related art in-cell touch sensor technology time-divides one frame period into a first period (hereinafter referred to as "display period"), in which the pixels are driven, and a second period (hereinafter referred to as a "touch period"), in which the touch sensors are driven, and drives the touch sensors only during the touch period. In the related art in-cell touch sensor technology, a touch report rate is set to be the same as a display frame rate. The touch report rate indicates a frequency at which coordinate data obtained by sensing all of the touch sensors present in the display panel is transmitted to an external host system. The display frame rate indicates a frequency at which all of the pixels present in the display panel are updated to new data. As the touch report rate increases, a time required to update coordinates of a touch input is reduced. Therefore, touch sensitivity a user perceives can be improved, and a touch input trace can be represented in detail. However, because the related art in-cell touch sensor technology recognizes the touch input at the touch report rate, which is set to be the same as the display frame rate, it is difficult to implement a fast response of the touch input.

The related art in-cell touch sensor technology may consider increasing a length of the touch period in a fixed length of one frame period to increase the touch report rate. In this case, a length of the display period has to be reduced based on the increase in the length of the touch period. However, an excessive reduction in the length of the display period leads to a reduction in display quality of an input image due to a shortage of a charge time of the input image.

SUMMARY

Accordingly, the present disclosure is directed to a touch sensor embedded display device and method for driving the same that substantially obviate one or more of the problems due to limitations and disadvantages of the related art.

An object of the present disclosure is to provide a touch sensor embedded display device and a method for driving the same capable of increasing touch sensitivity without reducing display quality of an input image.

Additional features and advantages will be set forth in the description which follows, and in part will be apparent from the description, or may be learned by practice of the invention. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, there is provided a touch sensor embedded display device, including: a display panel comprising pixels and touch sensors; a display driver configured to sequentially: perform a display scan of a first area of the display panel based on one display line in a display period; and apply data of an input image to the pixels of the first area; and a touch sensor driver configured to: simultaneously perform a touch scan of a first touch line of the display panel and a touch scan of a second touch line of the display panel in a touch period following the display period; and simultaneously sense touch inputs of the touch sensors on the first and second touch lines, wherein each of the first and second touch lines overlaps a plurality of display lines, and wherein a width of each of the first and second touch lines is greater than a width of each of the plurality of display lines.

In another aspect, there is provided a method for driving a touch sensor embedded display device comprising a display panel comprising pixels and touch sensors, the method comprising: sequentially: performing a display scan of a first area of the display panel based on one display line in a display period; and applying data of an input image to the pixels of the first area in the display period; simultaneously performing: a touch scan of a first touch line of the display panel and a touch scan of a second touch line of the display panel in a touch period following the display period; and simultaneously sensing touch inputs of the touch sensors on the first and second touch lines in the touch period, wherein each of the first and second touch lines overlaps a plurality of display lines, and wherein a width of each of the first and second touch lines is greater than a width of each of the plurality of display lines.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
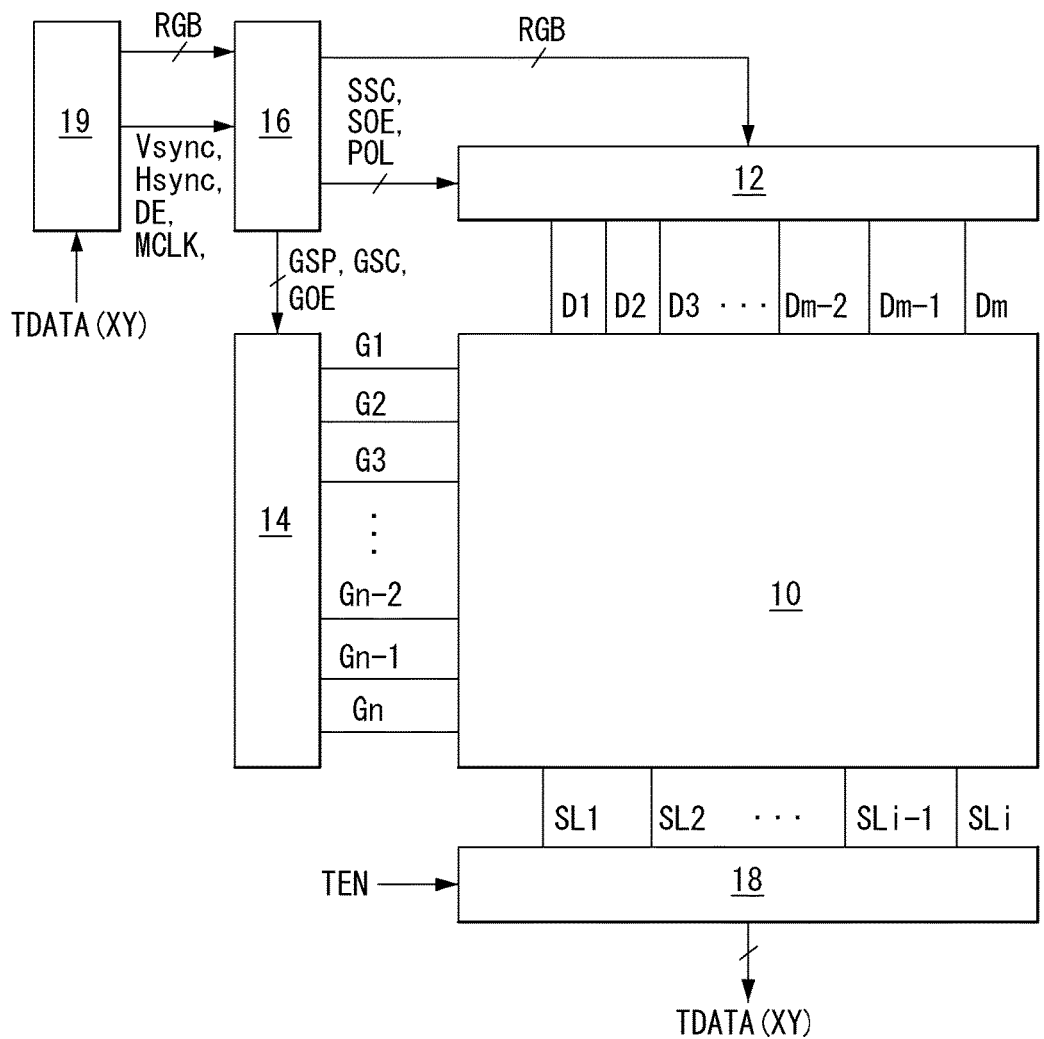
FIGS. 1 to 3 are schematic views showing a touch sensor embedded display device according to an example embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Hereinafter, example embodiments of the present disclosure will be described in detail with reference to the accompanying drawings.

Figure 2:
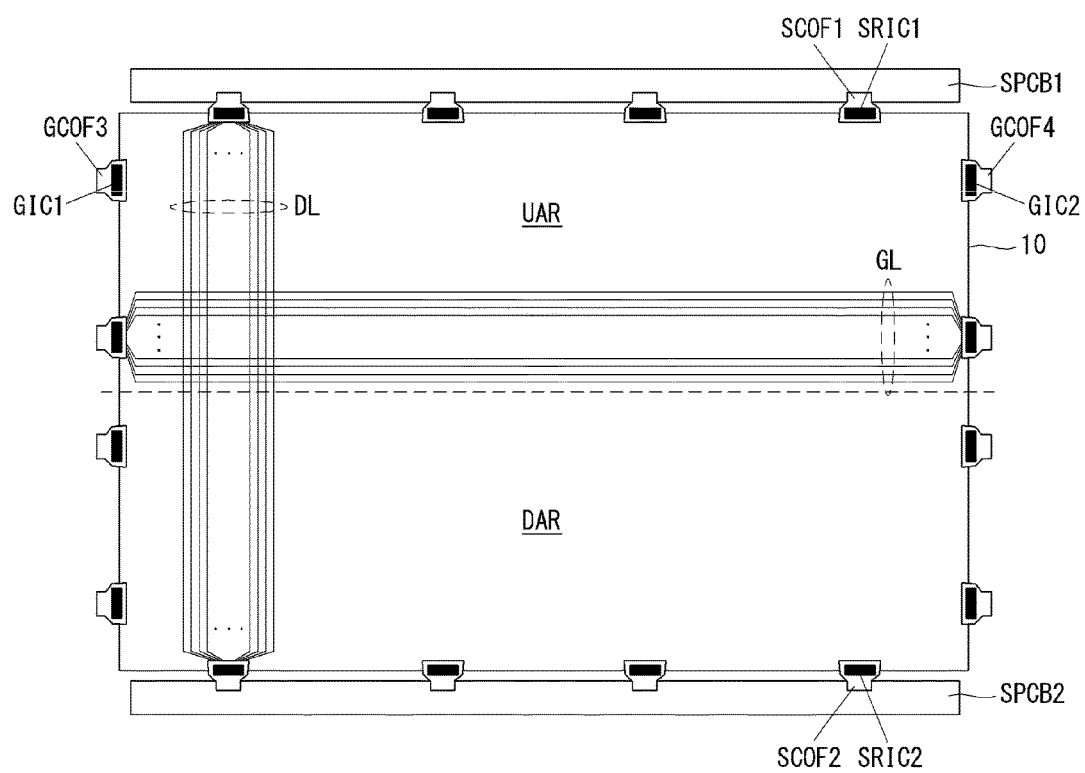
Figure 3:
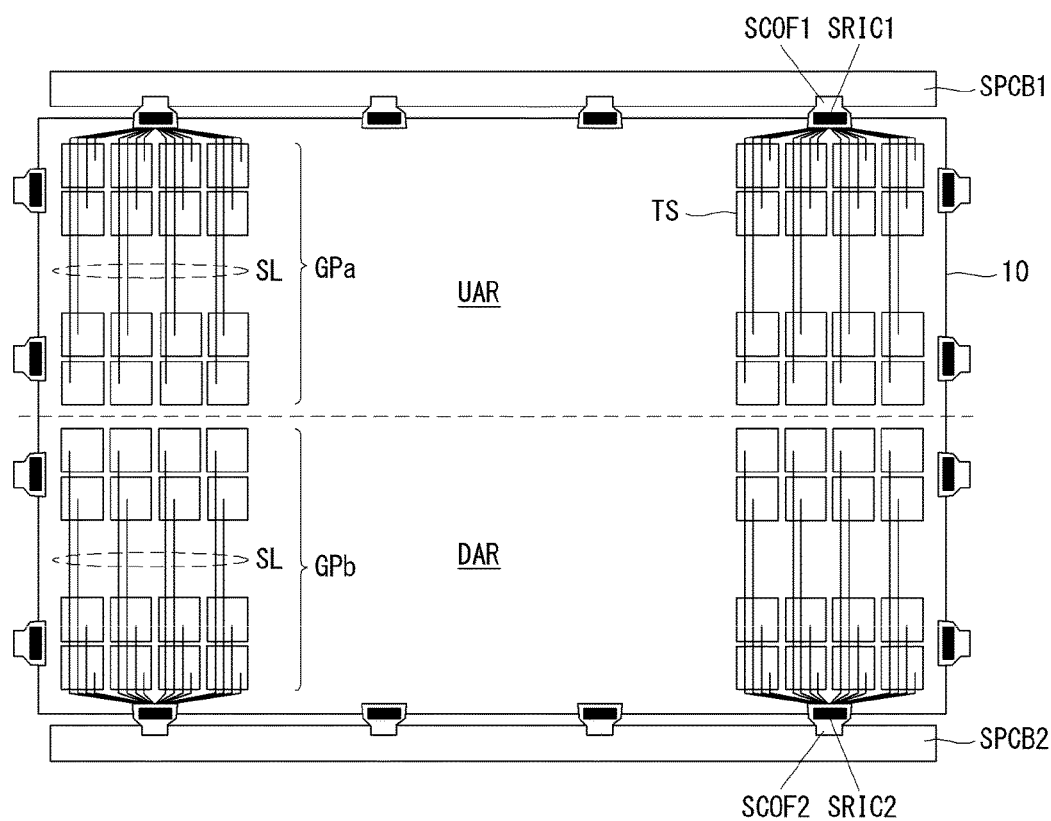
Figure 4:
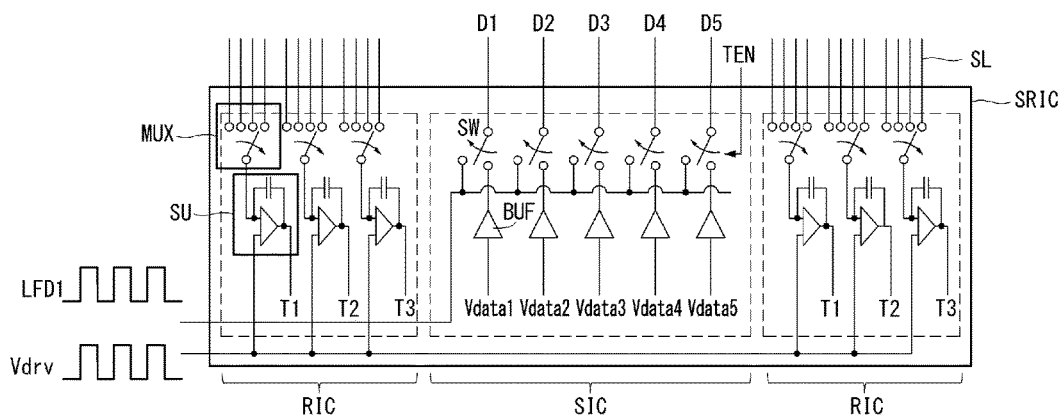
FIG. 4 is a circuit diagram showing an internal configuration of a source readout integrated circuit (SRIC) connected to sensor lines and data lines of a display panel.
Figure 5:
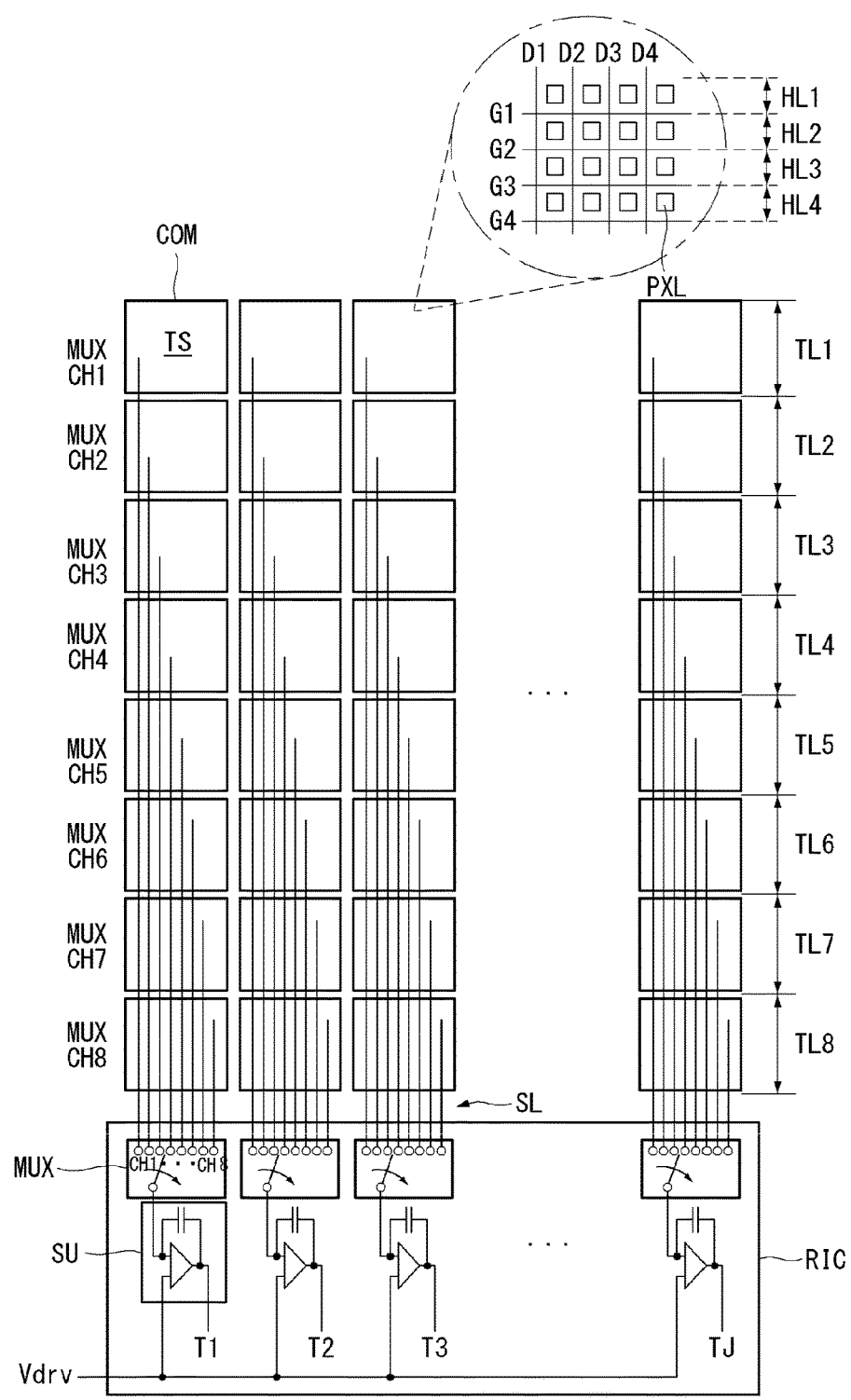
FIG. 5 is a circuit diagram showing a configuration of some touch sensors embedded in a pixel array and a readout integrated circuit (IC) for driving the touch sensors.
Figure 6:
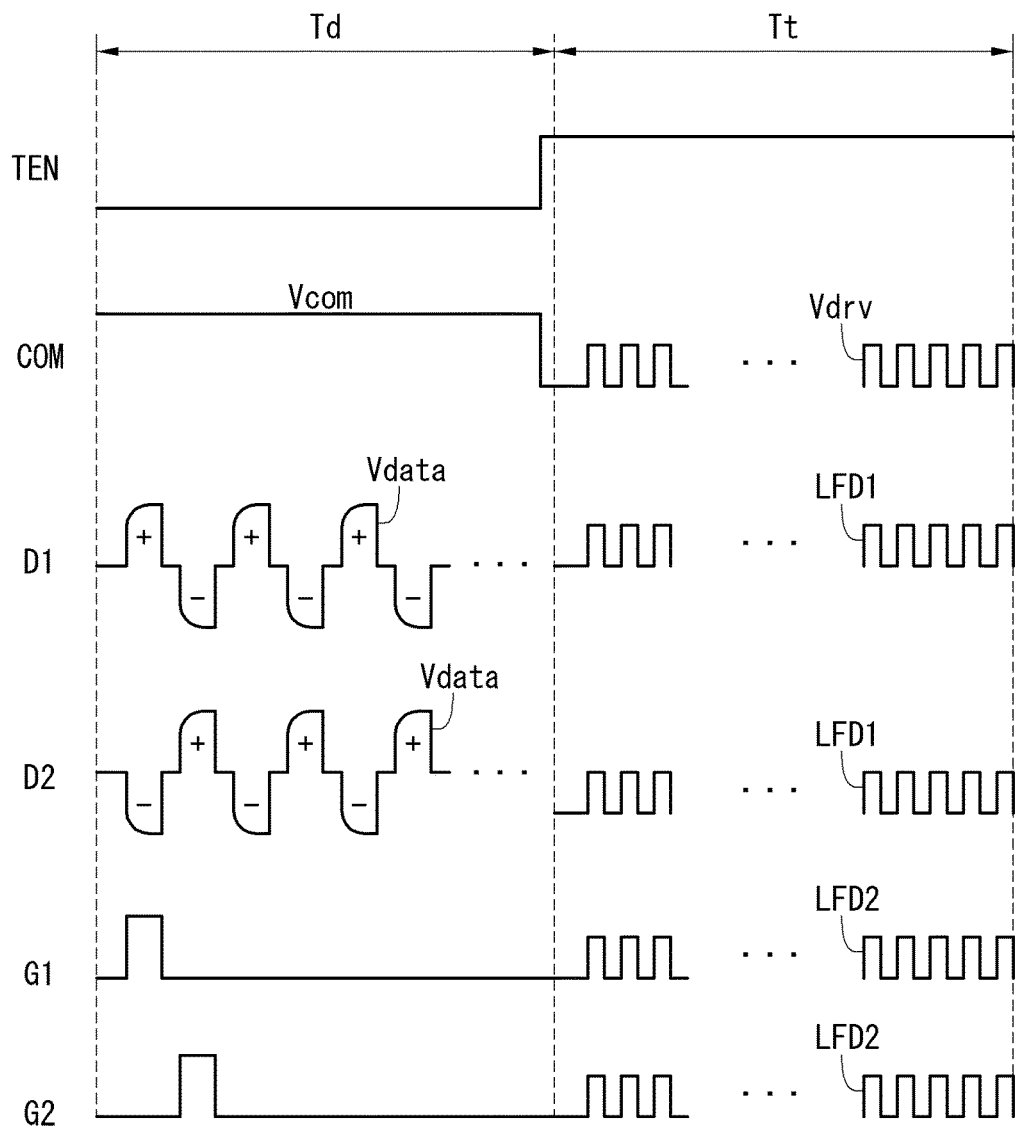
FIG. 6 is a waveform diagram showing signals supplied to touch sensors, data lines, and gate lines in a display period and a touch period.

FIGS. 1 to 3 are schematic views showing a touch sensor embedded display device according to an example embodiment. FIG. 4 is a circuit diagram showing an internal configuration of an SRIC connected to sensor lines and data lines of a display panel. FIG. 5 is a circuit diagram showing configuration of some of touch sensors embedded in a pixel array and a readout integrated circuit (IC) for driving the touch sensors. FIG. 6 is a waveform diagram showing signals supplied to touch sensors, data lines, and gate lines in a display period and a touch period.

With reference to the examples of FIGS. 1 to 6, a display device according to an example embodiment of the disclosure may be implemented based on a flat panel display, such as a liquid crystal display (LCD), a field emission display (FED), a plasma display panel (PDP), an organic light emitting diode (OLED) display, and an electrophoresis display (EPD). In the following description, example embodiments of the disclosure will be described using the liquid crystal display as an example of the flat panel display. However, embodiments are not limited thereto, and other flat panel displays may be used.

A touch sensor embedded display device according to an example embodiment of the disclosure may include a display panel 10, a display driver, a timing controller 16, a touch sensor driver 18, and a host system 19.

The display panel 10 may include a liquid crystal layer formed between an upper substrate and a lower substrate. A pixel array of the display panel 10 may include pixels PXL formed in pixel areas defined by data lines D1 to Dm and gate lines G1 to Gn, where m and n are positive integers. Each pixel PXL may include thin film transistors (TFTs) formed at crossings of the data lines D1 to Dm and the gate lines G1 to Gn, a pixel electrode charged to a data voltage, a storage capacitor connected to the pixel electrode and holding (e.g., storing) a voltage of a liquid crystal cell, and the like.

Black matrixes, color filters, and other elements may be formed on the upper substrate of the display panel 10. The lower substrate of the display panel 10 may be configured in a COT (color filter on TFT) structure. In one example, the black matrixes and the color filters may be formed on the lower substrate of the display panel 10. A common electrode, to which a common voltage Vcom is supplied, may be formed on the upper substrate or the lower substrate of the display panel 10. Polarizing plates may be respectively attached to the upper substrate and the lower substrate of the display panel 10. Alignment layers for setting a pre-tilt angle of liquid crystals may be respectively formed on the inner surfaces contacting the liquid crystals in the upper substrate and the lower substrate of the display panel 10. A column spacer may be formed between the upper substrate and the lower substrate of the display panel 10 to maintain constant cell gaps of the liquid crystal cells.

A backlight unit may be disposed under a back surface of the display panel 10. The backlight unit may be implemented, for example, as one of an edge type backlight unit and a direct type backlight unit and irradiates light onto the display panel 10. The display panel 10 may be implemented in any known mode including a twisted nematic (TN) mode, a vertical alignment (VA) mode, an in-plane switching (IPS) mode, a fringe field switching (FFS) mode, and the like.

The display driver may include a data driver 12 and a gate driver 14. The display driver may apply digital video data RGB of an input image to the pixels PXL of the display panel 10 under the control of the timing controller 16.

The data driver 12 may include a plurality of source driver ICs. The data driver 12 may convert the digital video data RGB received from the timing controller 16 into positive and negative analog gamma compensation voltages, and may output a data voltage. The data driver 12 may then supply the data voltage to the data lines D1 to Dm.

The gate driver 14 may include a plurality of gate driver ICs. The gate driver 14 may sequentially supply a gate pulse (or a scan pulse) synchronized with the data voltage to the gate lines G1 to Gn, and may select one display line of the display panel 10 to which the data voltage is applied. In the embodiment disclosed herein, "one display line" indicates one pixel line implemented by the pixels. The gate driver 14 may be directly formed on the lower substrate of the display panel 10 in a GIP (Gate driver In Panel) manner.

The timing controller 16 may receive timing signals, such as a vertical sync signal Vsync, a horizontal sync signal Hsync, a data enable signal DE, and a main clock MCLK, from the host system 19. The timing controller 16 may synchronize operation timings of the data driver 12 and the gate driver 14 with each other. The timing controller 16 may generate a data timing control signal and a scan timing control signal for respectively controlling the operation timings of the data driver 12 and the gate driver 14 using the timing signals. The data timing control signal may include a source sampling clock SSC, a source output enable signal SOE, a polarity control signal POL, and the like. The scan timing control signal may include a gate start pulse GSP, a gate shift clock GSC, a gate output enable signal GOE, and the like.

The host system 19 may transmit the digital video data RGB and the timing signals Vsync, Hsync, DE, and MCLK to the timing controller 16. Further, the host system 19 may execute an application associated with touch coordinate information TDATA(XY) received from a touch driving device 18.

The touch sensor driver 18 may include a readout IC RIC, a controller, a touch power IC, and the like. The touch sensor driver 18 may drive touch sensors TS embedded in the pixel array of the display panel 10. The touch sensors TS may be implemented as capacitive sensors sensing a touch input in a capacitive manner. The touch sensors TS may each have a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other. The touch sensor driver 18 may be connected to sense lines SL1 to SLi.

The touch sensor embedded display device according to an embodiment of the disclosure may adopt a double feeding method illustrated in FIGS. 2 and 3 to minimize a signal distortion attributable to an RC delay. According to the double feeding method, the data voltage may be simultaneously supplied to the data lines D1 to Dm from first and second sides of the display panel 10 that are opposite to each other, and the gate pulse may be simultaneously supplied to the gate lines G1 to Gn from third and fourth sides of the display panel 10 that are opposite to each other. However, embodiments of the disclosure are not limited thereto.

The data lines D1 to Dm may be connected to a plurality of first source driver ICs SIC1 positioned on the first side of the display panel 10, and at the same time, may be connected to a plurality of second source driver ICs SIC2 positioned on the second side of the display panel 10. The first and second source driver ICs SIC1 and SIC2 may be respectively embedded in source readout ICs SRIC1 and SRIC2. First and second readout ICs RIC1 and RIC2 driving the touch sensors TS may be additionally embedded in the SRIC1 and the SRIC2. The SRIC1 may be mounted on a first source COF (Chip On Film) SCOF1, and the SRIC2 may be mounted on a second source COF SCOF2. Each of the first and second source COFs SCOF1 and SCOF2 may be replaced by a source tape carrier package (TCP). The first source COFs SCOF1 may be connected to a first source printed circuit board (PCB) SPCB1, and the second source COFs SCOF2 may be connected to a second source PCB SPCB2. Input terminals of the first and second source COFs SCOF1 and SCOF2 are electrically connected to output terminals of the first and second source PCBs SPCB1 and SPCB2. Output terminals of the first and second source COFs SCOF1 and SCOF2 may be electrically connected to data pads formed on the lower substrate of the display panel 10 through an anisotropic conductive film (ACF). The first and second source COFs SCOF1 and SCOF2 may receive a data timing control signal, a driving voltage, and the digital video data RGB required in a display drive, a first AC (alternating current) signal required in a touch drive, and the like, from the first and second source PCBs SPCB1 and SPCB2, and may supply them to the first and second source driver ICs SIC1 and SIC2.

As shown in the FIG. 4 example, each of the first and second source driver ICs SIC1 and SIC2, which are represented in FIG. 4 by the example of a source driver IC SIC that is connected to data lines D1 to D5, may include output control switches SW, which may be turned on or off in response to a touch enable signal TEN. During a touch period, the output control switches SW may connect an input source of the first AC signal to the data lines D1 to D5 and cause the first AC signal to be supplied to the data lines D1 to D5. During a display period, the output control switches SW may connect output buffers BUF outputting data voltages Vdata1 to Vdata5 to the data lines D1 to D5, and may cause the data voltages Vdata1 to Vdata5 to be supplied to the data lines D1 to D5.

The gate lines G1 to Gn may be connected to a plurality of first gate driver ICs GIC1 positioned on the third side of the display panel 10, and at the same time, may be connected to a plurality of second gate driver ICs GIC2 positioned on the fourth side of the display panel 10. The first and second gate driver ICs GIC1 and GIC2 may be respectively mounted on a first gate COF GCOF3 and a second gate COF GCOF4. Each of the first and second gate COFs GCOF3 and GCOF4 may be replaced by a gate tape carrier package (TCP). Input terminals of the first and second gate COFs GCOF3 and GCOF4 may be electrically connected to the output terminals of the first and second source PCBs SPCB1 and SPCB2 through LOG (Line On Glass) lines (not shown) formed on the lower substrate of the display panel 10 and dummy lines (not shown) formed on the first and second source COFs SCOF1 and SCOF2. Output terminals of the first and second gate COFs GCOF3 and GCOF4 may be electrically connected to gate pads formed on the lower substrate of the display panel 10 through an ACF. The first and second gate COFs GCOF3 and GCOF4 may receive a scan timing control signal and the driving voltage required in the display drive, a second AC signal required in the touch drive, and the like, from the first and second source PCBs SPCB1 and SPCB2 and may supply them to the first and second gate driver ICs GIC1 and GIC2. The first and second gate driver ICs GIC1 and GIC2 may supply the gate pulse to the gate lines G1 to Gn during the display period, and may supply the second AC signal to the gate lines G1 to Gn during the touch period.

According to the double feeding method, the first readout IC RIC1 embedded in each SRIC1 may drive first touch sensors TS formed on an upper display surface UAR of the display panel 10, and the second readout IC RIC2 embedded in each SRIC2 may drive second touch sensors TS formed on a lower display surface DAR of the display panel 10. Hence, the distortion of a touch driving signal attributable to the RC delay may be minimized. To implement the double feeding method, the upper display surface UAR may include first sensor lines SL connecting the first readout IC RIC1 to the first touch sensors TS, and the lower display surface DAR may include second sensor lines SL connecting the second readout IC RIC2 to the second touch sensors TS.

As shown in the FIG. 4 example, each of the first and second readout ICs RIC1 and RIC2 may include a multiplexer MUX and a sensing unit SU. The multiplexer MUX may select the touch sensors TS accessed by the sensing unit SU under the control of the controller, and then may supply a touch driving signal Vdry to the selected touch sensors TS.

FIG. 5 shows an example of touch sensors TS of a predetermined group GPb included in the lower display surface DAR of FIG. 3 and the second readout IC RIC2 for driving the touch sensors TS. With reference to FIG. 5, when a resolution of the touch sensors TS is J×K, where J and K are positive integers equal to or greater than 2, the number of multiplexers MUX used for the resolution may be J. Each multiplexer MUX may be connected to the K touch sensors TS through K sensor lines SL, and may sequentially connect the K sensor lines SL to one sensing unit SU. For example, each multiplexer MUX may selectively connect eight multiplexer (mux) channels CH1 to CH8, respectively connected to eight sensor lines SL, to one sensing unit SU. When a first mux channel CH1 in each of the eight multiplexers MUX is connected to each sensing unit SU, the touch driving signal Vdry may be supplied to the touch sensors TS positioned on a first touch line TL1 through each sensing unit SU. Also, each sensing unit SU may convert an amount of charges received from the touch sensors TS of the first touch line TL1 into digital data T1 to TJ. When a second mux channel CH2 in each of the eight multiplexers MUX is connected to each sensing unit SU, the touch driving signal Vdry may be supplied to the touch sensors TS positioned on a second touch line TL2 through each sensing unit SU. Also, each sensing unit SU may convert an amount of charges received from the touch sensors TS of the second touch line TL2 into digital data T1 to TJ. In the same manner as this, when an eighth mux channel CH8 in each of the eight multiplexers MUX is connected to each sensing unit SU, the touch driving signal Vdry may be supplied to the touch sensors TS positioned on an eighth touch line TL8 through each sensing unit SU, and also each sensing unit SU may output an amount of charges received from the touch sensors TS of the eighth touch line TL8 as digital data T1 to TJ.

In other words, the first touch line TL1 may be driven when the first mux channel CH1 of each multiplexer MUX is connected to each sensing unit SU, and the second touch line TL2 may be driven when the second mux channel CH2 of each multiplexer MUX is connected to each sensing unit SU. Further, the eighth touch line TL8 may be driven when the eighth mux channel CH8 of each multiplexer MUX is connected to each sensing unit SU. The above may apply similarly to the third through seventh mux channels CH3-CH7.

Each sensing unit SU may include an amplifier for amplifying received voltages of the touch sensors TS, an integrator accumulating the amplified voltages of the amplifier, and an analog-to-digital converter (ADC) for converting a voltage of the integrator into digital data. The digital data T1 to TJ output from the ADC is touch raw data, and may be transmitted to the controller.

With reference to the FIG. 5 example, a common electrode COM of the pixels PXL may be divided into a plurality of segments, and the touch sensors TS may be implemented as the divided common electrodes COM. One common electrode segment may be commonly connected to the plurality of pixels PXL, and may form one touch sensor TS. The touch sensors TS positioned on one line in parallel with one another may form one touch line TL. Thus, each of the touch lines TL1 to TL8 may overlap a plurality of display lines HL1 to HL4, and a width of each of the touch lines TL1 to TL8 may be greater than a width of one display line HL.

Touch sensors TS of a predetermined group GPa included in the upper display surface UAR of FIG. 3 and the first readout IC RIC1 for driving the touch sensors TS may be configured in a substantially similar manner as FIG. 5. Thus, a further description may be briefly made or may be omitted entirely.

The display device according to an embodiment may increase a touch report rate in one frame period using the double feeding method, compared to a related art. For example, as shown in FIGS. 10 to 13, an embodiment may sequentially perform a display scan in a direction from the upper side to the lower side of the display panel 10 based on one display line during the display period, and may sequentially perform a touch scan in a direction from each of the upper and lower sides of the display panel 10 to the middle of the display panel 10 or the opposite direction during the touch period following the display period to output a touch report two times in one frame period, which may simultaneously perform the touch scan every two touch lines. Further, as shown in the examples of FIGS. 18 to 21, an embodiment may sequentially perform a display scan along one direction of the display panel 10 based on one display line during the display period, and may sequentially perform a touch scan in the same direction as the display scan during the touch period following the display period to output the touch report two times in one frame period, which may also simultaneously perform the touch scan every two touch lines. In an example embodiment, the display scan may indicate an operation for driving the display lines HL through signal lines (including the data lines and the gate lines) of the display panel 10 and applying data of the input image to the pixels PXL of the display panel 10. The touch scan may indicate an operation for driving the touch lines TL through the sensor lines SL of the display panel 10 and sensing changes in an amount of charges with respect to the touch sensors TS of the display panel 10.

In the touch sensor embedded display device according to an embodiment of the disclosure, a driving period of the display device, as shown in the FIG. 6 example, may be time-divided into a display period Td and a touch period Tt. The display drivers 12 and 14 and the touch sensor driver 18 may be synchronized with each other in response to the touch enable signal TEN. A first logic level of the touch enable signal TEN may define the display period Td, and a second logic level of the touch enable signal TEN may define the touch period Tt. As shown in the example of FIG. 6, the first logic level may be a low logic level, and the second logic level is a high logic level, and vice versa, although embodiments are not limited thereto. In FIG. 6, "COM" denotes a common electrode pattern implementing the touch sensor.

The display drivers 12 and 14 may apply the digital video data RGB of the input image to the pixels PXL in accordance with the display scan during the display period Td. The pixels PXL may hold the data voltage, which may have been charged to the pixels PXL during the display period Td because the TFTs of the pixels PXL are in an off-state during the touch period Tt. The display drivers 12 and 14 may supply AC signals LFD1 and LFD2, each having the same phase and the same amplitude as the touch driving signal Vdrv, to the signal lines D1 to Dm and G1 to Gn to minimize a parasitic capacitance between the touch sensors TS and the signal lines D1 to Dm and G1 to Gn connected to the pixels PXL during the touch period Tt.

The data driver 12 may supply the first AC signal LFD1, having the same phase and the same amplitude as the touch driving signal Vdry applied to the touch sensors TS, to the data lines D1 to Dm during the touch period Tt, thereby minimizing a parasitic capacitance between the touch sensors TS and the data lines D1 to Dm. This is because voltages at both ends of the parasitic capacitance may simultaneously change, and an amount of charges charged to the parasitic capacitance may decrease as a voltage difference between both ends of the parasitic capacitance decreases. A voltage of the first AC signal LFD1 supplied to the data lines D1 to Dm during the touch period Tt may be the same as the touch driving signal Vdrv.

The gate driver 14 may supply the second AC signal LFD2, having the same phase and the same amplitude as the touch driving signal Vdry applied to the touch sensors TS, to the gate lines G1 to Gn during the touch period Tt, thereby minimizing a parasitic capacitance between the touch sensors TS and the gate lines G1 to Gn. This is because voltages at both ends of the parasitic capacitance may simultaneously change, and an amount of charges charged to the parasitic capacitance may decrease as a voltage difference between both ends of the parasitic capacitance decreases. A voltage of the second AC signal LFD2 supplied to the gate lines G1 to Gn during the touch period Tt may be less than a gate high voltage VGH, and may be less than a threshold voltage of the TFT, so that data applied to the pixels PXL does not change.

Figure 7:
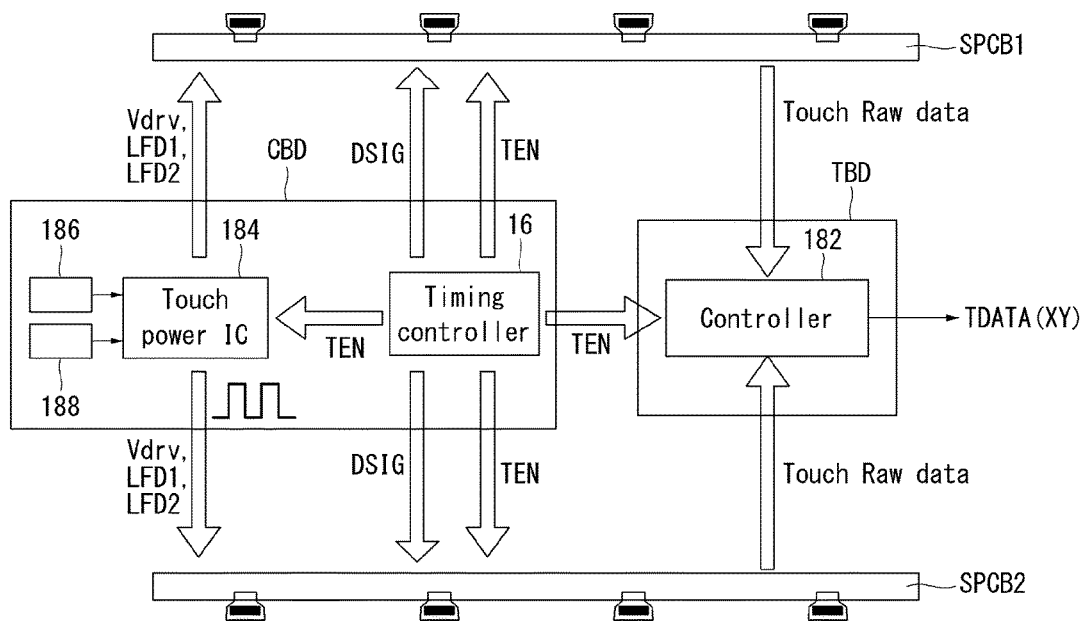
FIG. 7 is a schematic flow diagram showing a signal transmission flow between a source printed circuit board (PCB) connected to a display panel, a touch sensor driver, and a timing controller.
Figure 8:
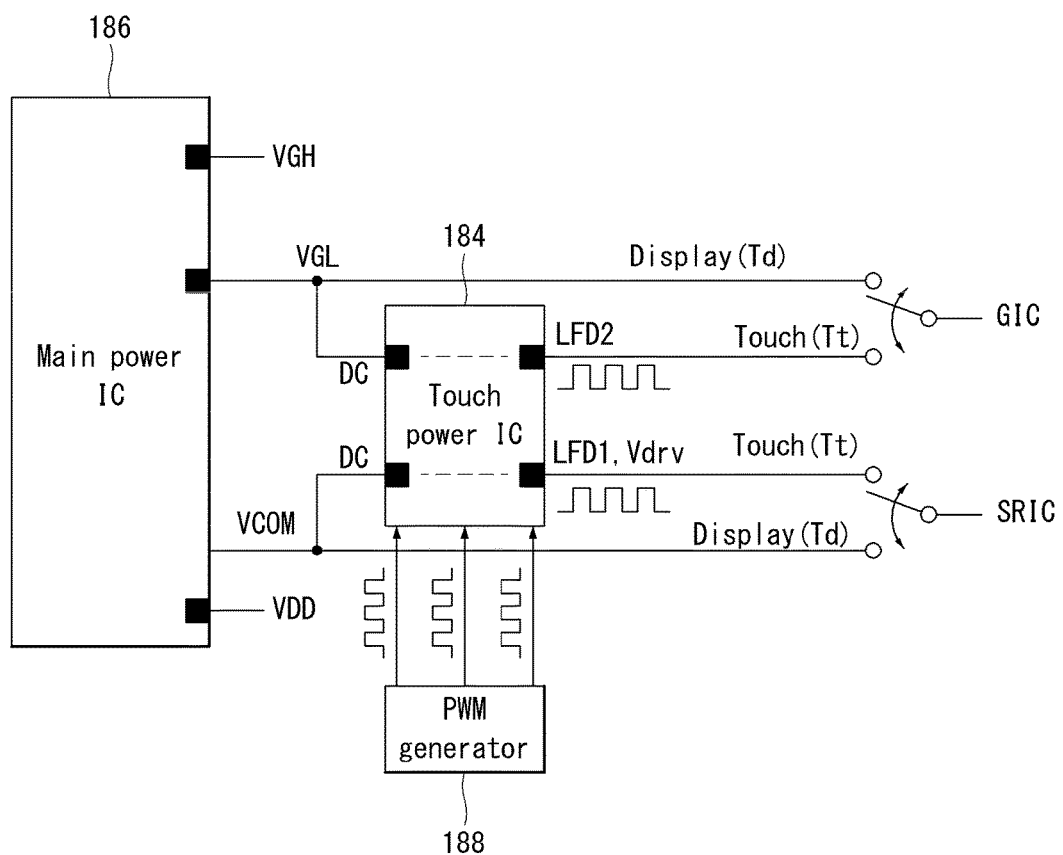
FIG. 8 is a schematic diagram showing that a touch sensor driver produces a touch driving signal and alternating current (AC) signals and outputs the touch driving signal and the AC signals in a touch period.

FIG. 7 is a schematic flow diagram showing a signal transmission flow between the source PCBs SPCB1 and SPCB2 connected to the display panel 10, the touch sensor driver 18, and the timing controller 16. FIG. 8 is a schematic diagram showing that the touch sensor driver 18 produces the touch driving signal Vdry and the AC signals LFD1 and LFD2 and selectively outputs the touch driving signal Vdry and the AC signals LFD1 and LFD2 in the touch period.

With reference to FIGS. 7 and 8, a controller 182 of the touch sensor driver 18 may be mounted on a touch board TBD. A touch power IC 184, a main power IC 186, and a pulse width modulation (PWM) generator 188 of the touch sensor driver 18 may be mounted on a control board CBD. The timing controller 16 may be additionally mounted on the control board CBD. The timing controller 16 may produce the touch enable signal TEN based on the vertical sync signal Vsync, and so on, and may control operations of the controller 182, the touch power IC 184, the display driver, and the like. The timing controller 16 may also produce a data signal DSIG.

The touch power IC 184 may receive a gate low voltage VGL of a DC (direct current) level and the common voltage Vcom from the main power IC 186. The gate low voltage VGL may be a voltage capable of turning off the TFTs included in the display panel 10. The touch power IC 184 may level-shift a PWM signal received from the PWM generator 188 based on the common voltage Vcom, and may produce the touch driving signal Vdry and the first AC signal LFD1. The touch power IC 184 may supply the signals Vdry and LFD1 to the SRIC1 through the first source PCB SPCB1 and the first source COF SCOF1, and may supply the signals Vdry and LFD1 to the SRIC2 through the second source PCB SPCB2 and the second source COF SCOF2 during the touch period Tt. The touch power IC 184 may level-shift the PWM signal received from the PWM generator 188 based on the gate low voltage VGL, and may produce the second AC signal LFD2. The touch power IC 184 may supply the second AC signal LFD2 to the first gate driver IC GIC1 through the first source PCB SPCB1, the first source COF SCOF1, the first LOG, the first gate COF GCOF3, and the like; and may supply the second AC signal LFD2 to the second gate driver IC GIC2 through the second source PCB SPCB2, the second source COF SCOF2, the second LOG, the second gate COF GCOF4, and the like, during the touch period Tt.

The main power IC 186 may produce a DC power voltage including the gate high voltage VGH, the gate low voltage VGL, the common voltage Vcom, a high potential driving voltage VDD, and the like. The gate high voltage VGH may be a voltage capable of turning on the TFTs included in the display panel 10. The gate high voltage VGH and the gate low voltage VGL may be voltages for producing the gate pulse (or scan pulse) applied to the gate lines. The high potential driving voltage VDD may be a power voltage supplied to a gamma string included in the source driver IC SIC.

The controller 182 may control phases of the PWM signals output from the PWM generator 188, and may synchronize phases of the touch driving signal Vdry and the AC signals LFD1 and LFD2. Further, the controller 182 may control the touch power IC 184, and may cause the touch driving signal Vdry and the AC signals LFD1 and LFD2 to have the same amplitude. The controller 182 may analyze touch raw data of each touch input, may calculate touch coordinates of each touch input, and may transmit touch data TDATA(XY), including coordinate information of the touch input, to the external host system 19.

Figure 9A:
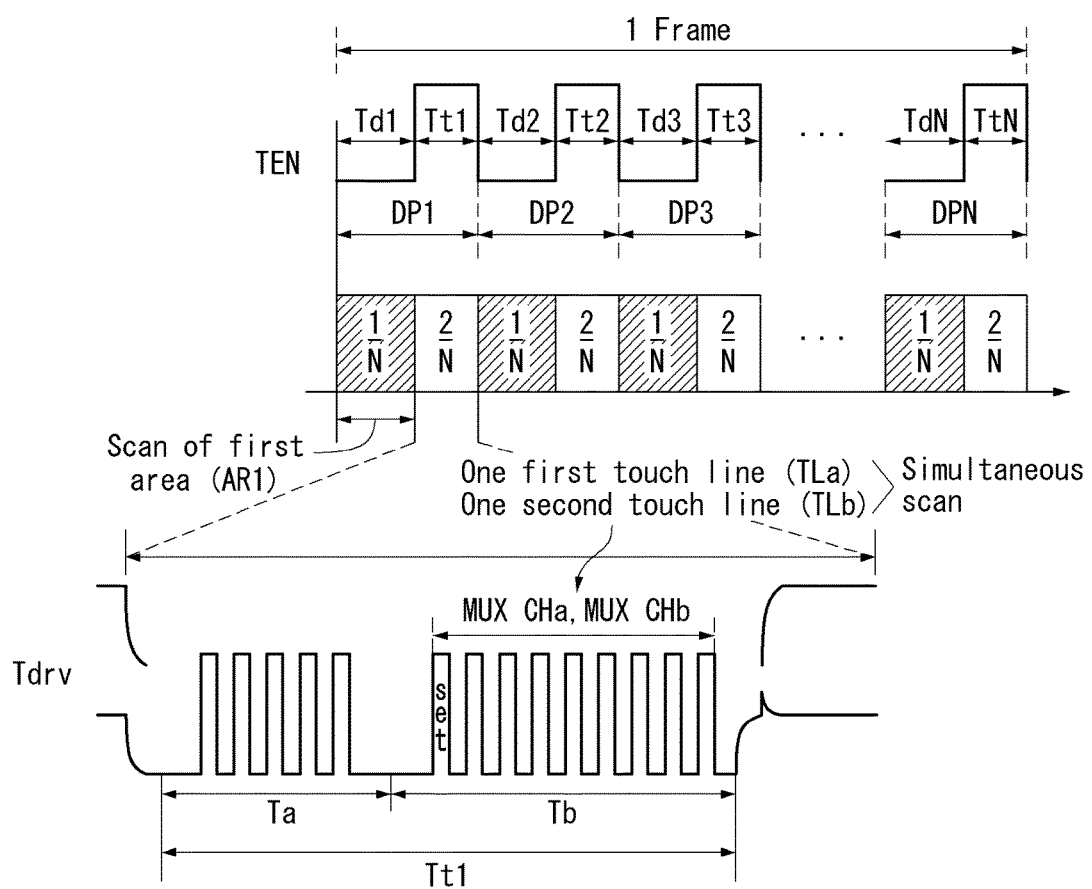
FIGS. 9A and 9B are timing diagrams showing examples of a method for time-division driving pixels of a display panel and touch sensors to increase a touch report rate.
Figure 9B:
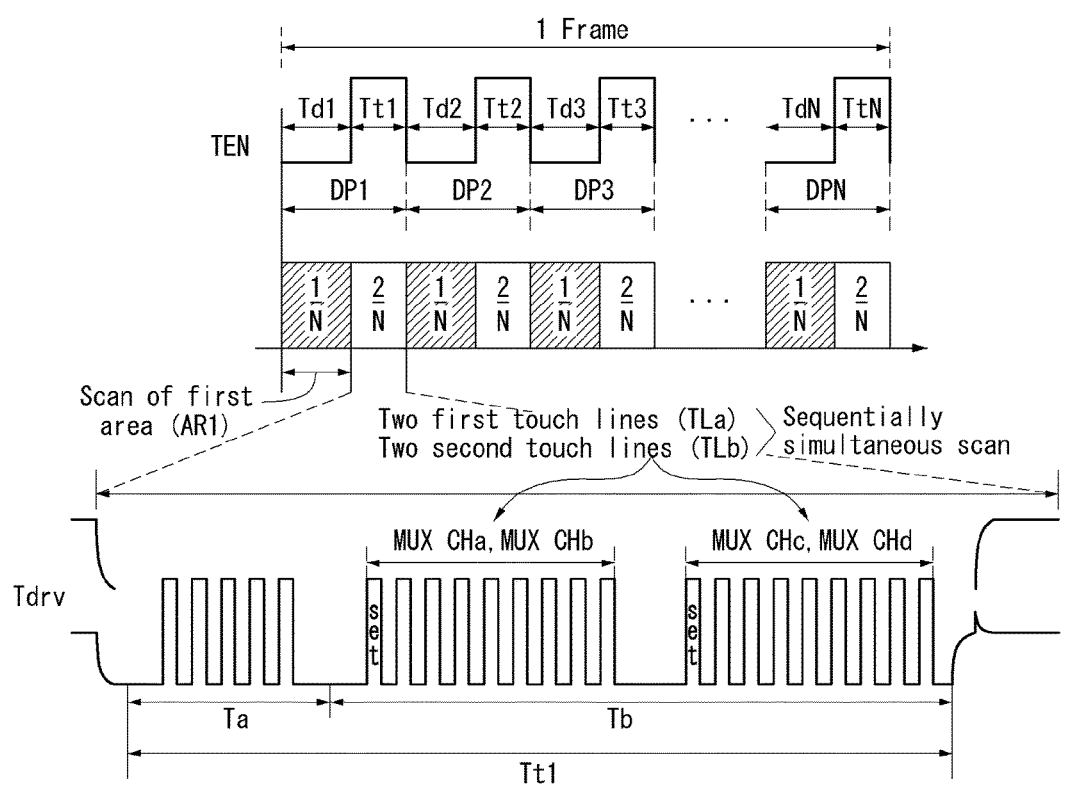

FIGS. 9A and 9B are timing diagrams showing examples of a method for time-division driving the pixels of the display panel and the touch sensors to increase a touch report rate.

The display device according to an embodiment of the disclosure may include a plurality of driving periods shown in the FIG. 6 example in one frame period. As shown in the examples of FIGS. 9A and 9B, the display device according to an embodiment may include a plurality of driving periods DP1 to DPN in one frame period.

One of display periods Td1 to TdN and one of touch periods Tt1 to TtN may be assigned to each of the driving periods DP1 to DPN. The first driving period DP1 is described as an example below. The first driving period DP1 may include the first display period Td1 and the first touch period Tt1 which may be successively arranged. In the first display period Td1, a display scan of a first area AR1 of the display panel 10 may be performed. In the first touch period Tt1, a touch scan of a first touch line TLa and a second touch line TLb of the display panel 10 may be performed. In one example embodiment, the first touch line TLa may be positioned on the upper display surface UAR of the display panel 10, and the second touch line TLb may be positioned on the lower display surface DAR of the display panel 10. In the first touch period Tt1, the touch sensor driver 18 may simultaneously perform the touch scan of the first touch line TLa and the touch scan of the second touch line TLb of the display panel 10, and may simultaneously sense the touch inputs of the touch sensors TS on the first and second touch lines TLa and TLb.

As shown in the FIG. 9A example, each of the first and second touch lines TLa and TLb may be a single line. As an example, the multiplexers of the first readout IC embedded in the SRIC1 may cause the first mux channels CHa to be electrically connected during an effective sensing period Tb of the first touch period Tt1, and may drive the touch sensors TS disposed on the first touch line TLa. And at the same time, the multiplexers of the second readout IC embedded in the SRIC2 may cause the second mux channels CHb to be electrically connected, and may drive the touch sensors TS disposed on the second touch line TLb.

As shown in the FIG. 9B example, each of the first touch line TLa and the second touch line TLb may be a plurality of lines. As an example, the multiplexers of the first readout IC embedded in the SRIC1 may cause the first mux channels CHa to be electrically connected during a portion of the effective sensing period Tb of the first touch period Tt1 and sense the touch sensors disposed on a 1-1 touch line TLa. And at the same time, the multiplexers of the second readout IC embedded in the SRIC2 may cause the second mux channels CHb to be electrically connected and sense the touch sensors disposed on a 2-1 touch line TLb. Further, the multiplexers of the first readout IC embedded in the SRIC1 may cause third mux channels CHc to be electrically connected during a remaining effective sensing period Tb of the first touch period Tt1 and sense the touch sensors disposed on a 1-2 touch line TLa. And at the same time, the multiplexers of the second readout IC embedded in the SRIC2 may cause fourth mux channels CHd to be electrically connected and sense the touch sensors disposed on a 2-2 touch line TLb. The 1-1 touch line TLa and the 1-2 touch line TLa may be positioned adjacent to each other, and the 2-1 touch line TLb and the 2-2 touch line TLb may be positioned adjacent to each other. In FIGS. 9A and 9B, "Ta" denotes a free driving period. The free driving period is described in detail later with reference to the examples of FIGS. 15 to 17C.

Figure 10:
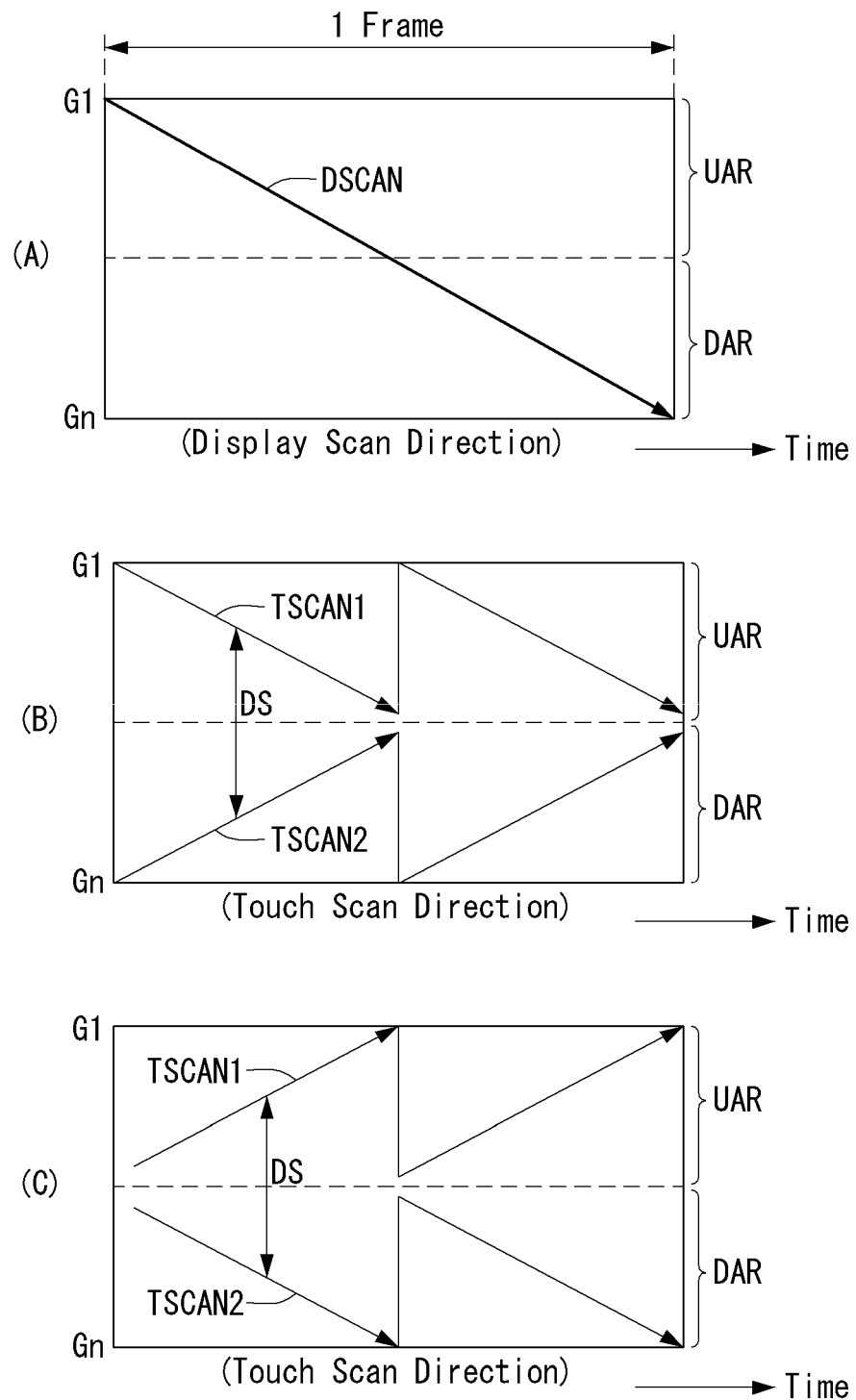
FIG. 10 is a set of graphs illustrating a display scan direction and a touch scan direction according to an example embodiment.
Figure 11A:
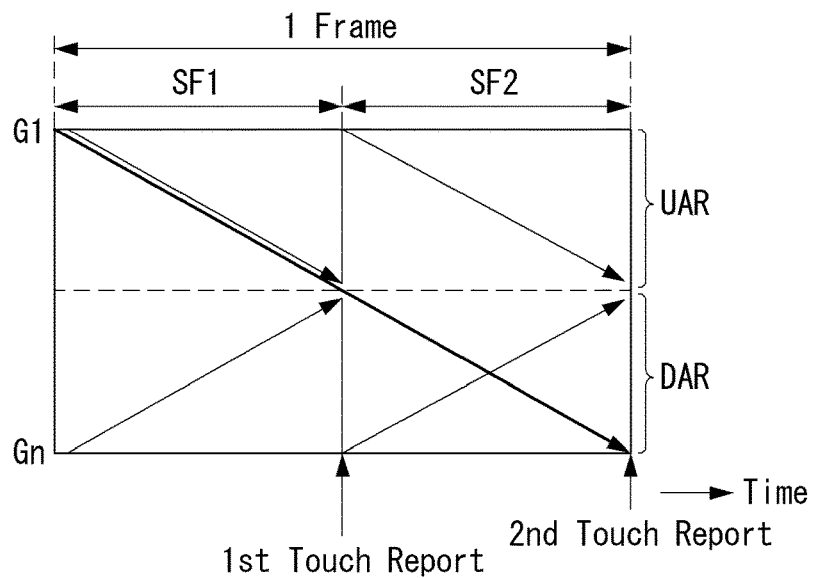
FIGS. 11A and 11B are graphs showing that a touch report rate increases by touch-scanning all touch lines two times in one frame period.
Figure 11B:
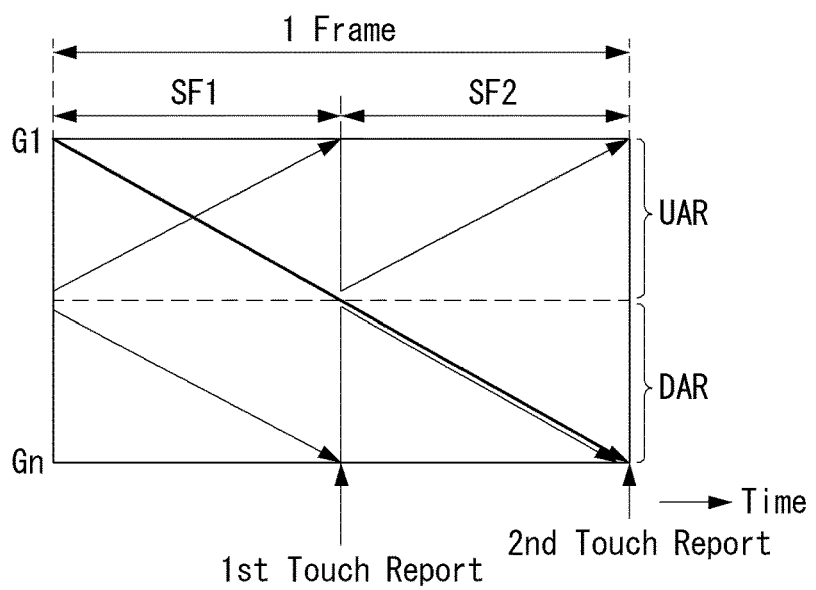
Figure 12:
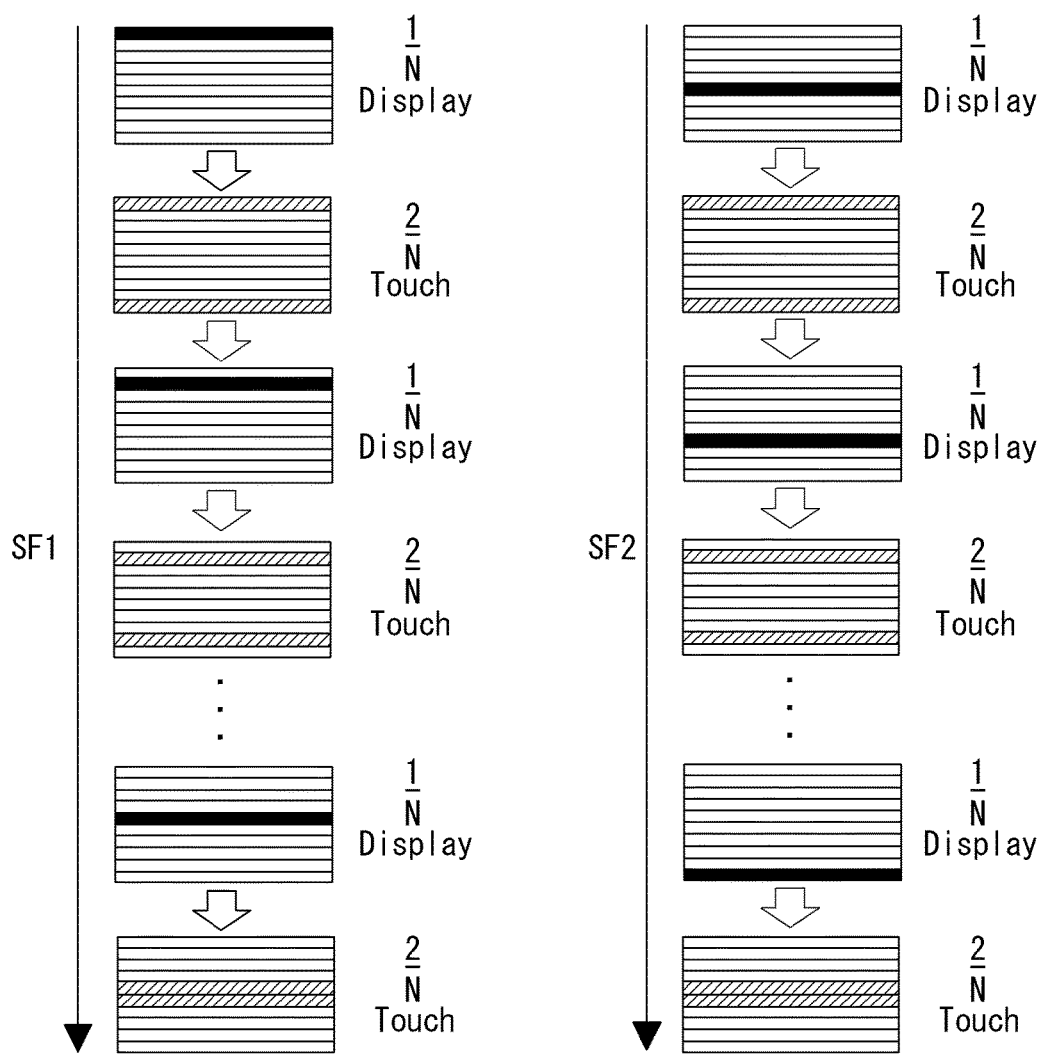
FIGS. 12 and 13 are schematic flow diagrams showing a display scan, which is sequentially performed based on one display line in a direction from the upper side to the lower side of a display panel, and a touch scan direction, which is sequentially and simultaneously performed every two touch lines in a direction from each of the upper and lower sides of the display panel to the middle of the display panel to output a touch report two times in one frame period.
Figure 13:
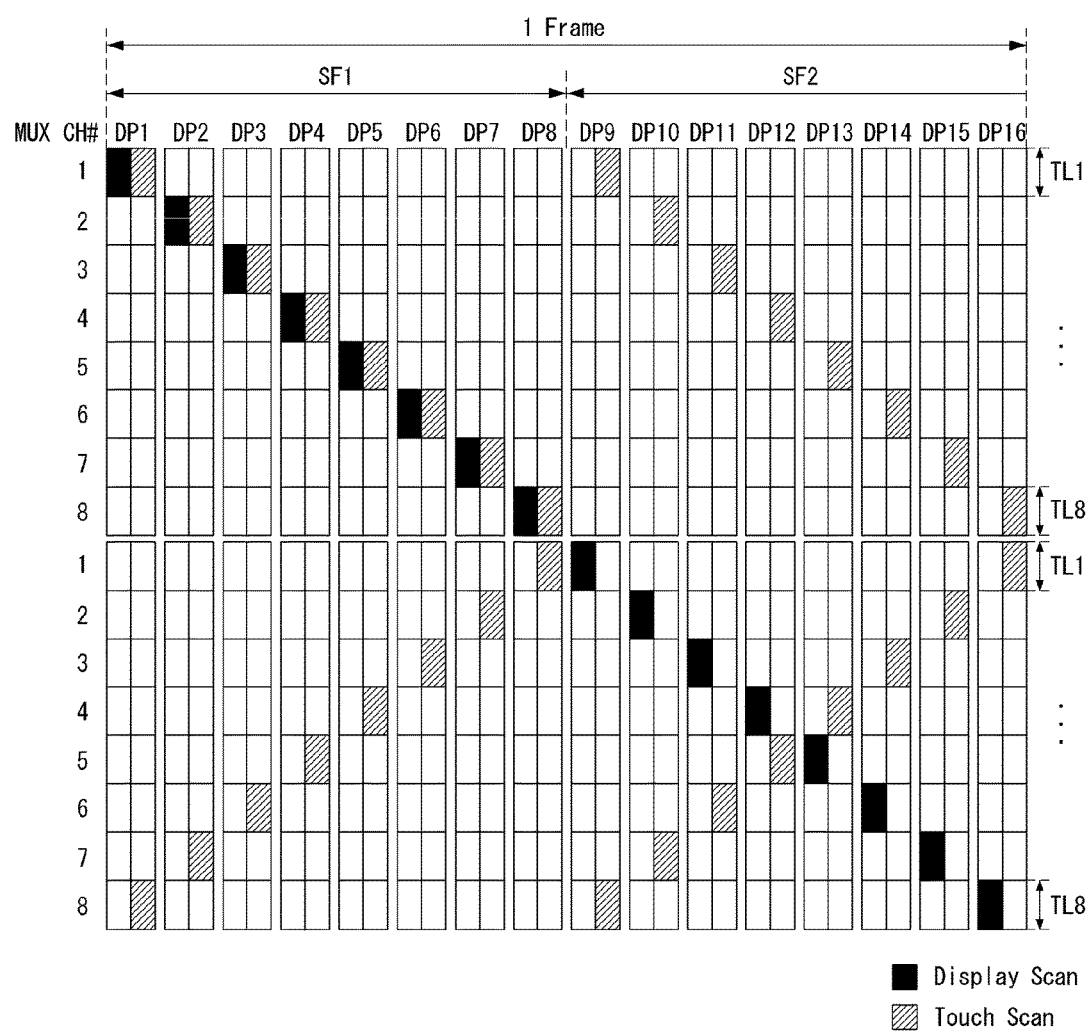

FIGS. 10 to 13 illustrate an embodiment of the disclosure for increasing the touch report rate. FIG. 10 is a set of graphs illustrating a display scan direction and a touch scan direction according to an example embodiment. FIGS. 11A and 11B are graphs showing that a touch report rate increases by touch-scanning all touch lines two times in one frame period. FIGS. 12 and 13 are schematic flow diagrams showing a display scan, which is sequentially performed based on one display line in a direction from the upper side to the lower side of a display panel, and a touch scan direction, which is sequentially and simultaneously performed every two touch lines in a direction from each of the upper and lower sides of the display panel to the middle of the display panel to output a touch report two times in one frame period.

With reference to FIGS. 10 to 13, an embodiment may perform the touch scan two times while the display scan is performed once during one frame period, and may also cross an extension line of a display scan direction DSCAN and extension lines of touch scan directions TSCAN1 and TSCAN2 in the one frame period. For example, as shown in graph (A) of FIG. 10, an embodiment may sequentially perform the display scan in a direction from the upper side to the lower side of the display panel 10 based on one display line through the display periods Td1 to TdN of one frame period. As shown in graphs (B) and (C) of FIG. 10, an embodiment may sequentially perform the touch scan in a direction from each of the upper and lower sides of the display panel 10 to the middle of the display panel 10 or the opposite direction through the touch periods Tt1 to TtN of one frame period. For example, an embodiment may simultaneously perform the touch scan every two touch lines. As a result, a separation distance DS between the first touch line TLa and the second touch line TLb, which may be simultaneously touch-scanned, may change in one frame period.

As shown in the examples of FIGS. 11A and 11B, when one frame period includes a first subframe SF1 and a second subframe SF2 which are successively arranged, the touch report may be output at an end time point of the first subframe SF1 and an end time point of the second subframe SF2. Hence, the touch report may be output twice in one frame period.

As a detailed example of FIG. 11A, an embodiment, as shown in the examples of FIGS. 12 and 13, may be configured such that one frame period includes a first subframe SF1 including first to eighth driving periods DP1 to DP8 and a second subframe SF2 including ninth to sixteenth driving periods DP9 to DP16.

An embodiment may sequentially perform the display scan of an area 1 corresponding to 1/N of the display panel 10 based on one display line during a display period Td1 of the first driving period DP1. Subsequently, an embodiment may simultaneously perform the touch scan of an area (e.g., a first touch line TL1 of the upper display surface UAR and an eighth touch line TL8 of the lower display surface DAR) corresponding to 2/N of the display panel 10 during a touch period Tt1 of the first driving period DP1. In one example, the area 1 may overlap the first touch line TL1 of the upper display surface UAR. An embodiment may sequentially perform the display scan of an area 2 corresponding to 1/N of the display panel 10 based on one display line during a display period Td2 of the second driving period DP2. Subsequently, an embodiment may simultaneously perform the touch scan of an area (e.g., a second touch line TL2 of the upper display surface UAR and a seventh touch line TL7 of the lower display surface DAR) corresponding to 2/N of the display panel 10 during a touch period Tt2 of the second driving period DP2. In one example, the area 2 may overlap the second touch line TL2 of the upper display surface UAR. Further, an embodiment may sequentially perform the display scan of an area 8 corresponding to 1/N of the display panel 10 based on one display line during a display period Td8 of the eighth driving period DP8. Subsequently, an embodiment may simultaneously perform the touch scan of an area (e.g., an eighth touch line TL8 of the upper display surface UAR and a first touch line TL1 of the lower display surface DAR) corresponding to 2/N of the display panel 10 during a touch period Tt8 of the eighth driving period DP8. In one example, the area 8 may overlap the eighth touch line TL8 of the upper display surface UAR. Through the above-described method, an embodiment may perform the touch scan of all of the touch lines of the display panel 10 in the first subframe SF1, in which the display scan of the upper display surface UAR is performed, thereby outputting a first touch report.

An embodiment may sequentially perform the display scan of an area 9 corresponding to 1/N of the display panel 10 based on one display line during a display period Td9 of the ninth driving period DP9. Subsequently, an embodiment may simultaneously perform the touch scan of an area (e.g., the first touch line TL1 of the upper display surface UAR and the eighth touch line TL8 of the lower display surface DAR) corresponding to 2/N of the display panel 10 during a touch period Tt9 of the ninth driving period DP9. In one example, the area 9 may not overlap the touch lines TL1 and TL8 which are successively touch-scanned. An embodiment may sequentially perform the display scan of an area 10 corresponding to 1/N of the display panel 10 based on one display line during a display period Td10 of the tenth driving period DP10. Subsequently, an embodiment may simultaneously perform the touch scan of an area (e.g., the second touch line TL2 of the upper display surface UAR and the seventh touch line TL7 of the lower display surface DAR) corresponding to 2/N of the display panel 10 during a touch period Tt10 of the tenth driving period DP10. In one example, the area 10 may not overlap the touch lines TL2 and TL7 which are successively touch-scanned. Further, an embodiment may sequentially perform the display scan of an area 16 corresponding to 1/N of the display panel 10 based on one display line during a display period Td16 of the sixteenth driving period DP16. Subsequently, an embodiment may simultaneously perform the touch scan of an area (e.g., the eighth touch line TL8 of the upper display surface UAR and the first touch line TL1 of the lower display surface DAR) corresponding to 2/N of the display panel 10 during a touch period Tt16 of the sixteenth driving period DP16. In one example, the area 16 may not overlap the touch lines TL8 and TL1 which are successively touch-scanned. Through the above-described method, an embodiment may perform the touch scan of all of the touch lines of the display panel 10 in the second subframe SF2, in which the display scan of the lower display surface DAR is performed, thereby outputting a second touch report.

In the FIG. 11A example, the separation distance DS between the first touch line TLa and the second touch line TLb, which are simultaneously touch-scanned, may have a maximum value at a start time point of each of the first subframe SF1 and the second subframe SF2, and may have a minimum value at an end time point of each of the first subframe SF1 and the second subframe SF2. Further, in FIG. 11A, the first area of the first subframe SF1, in which the display scan is performed, and the first touch line TLa may overlap each other.

On the other hand, in the FIG. 11B example, the separation distance DS between the first touch line TLa and the second touch line TLb, which are simultaneously touch-scanned, may have a minimum value at a start time point of each of the first subframe SF1 and the second subframe SF2, and may have a maximum value at an end time point of each of the first subframe SF1 and the second subframe SF2. The FIG. 11B example is different from the FIG. 11A example in the touch scan directions TSCAN1 and TSCAN2. In the FIG. 11B example, the first area of the second subframe SF2, in which the display scan is performed, and the second touch line TLb may overlap each other.

Figure 14:
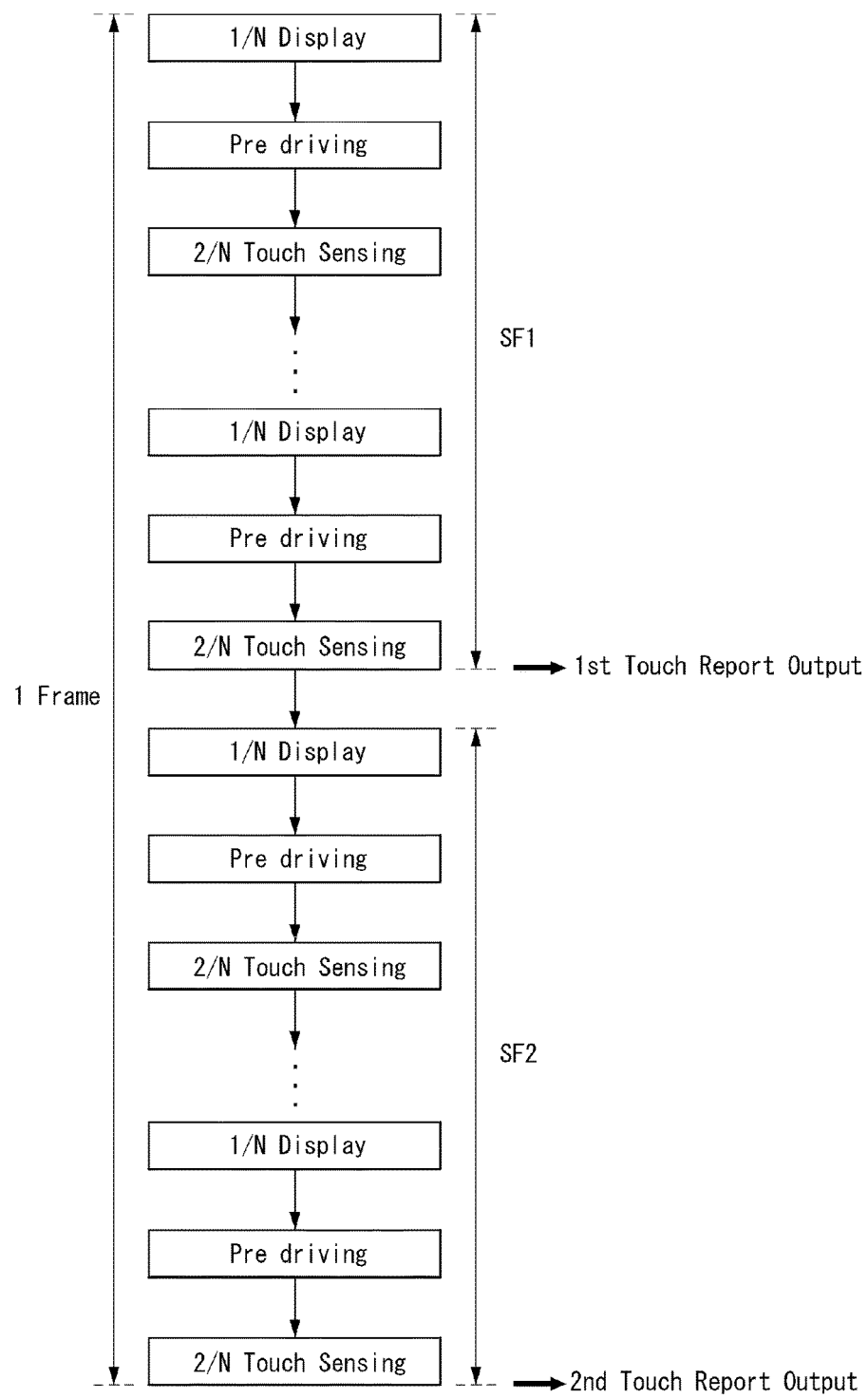
FIG. 14 is a flow diagram showing that a touch period includes a free driving period and an effective sensing period following the free driving period.
Figure 15:
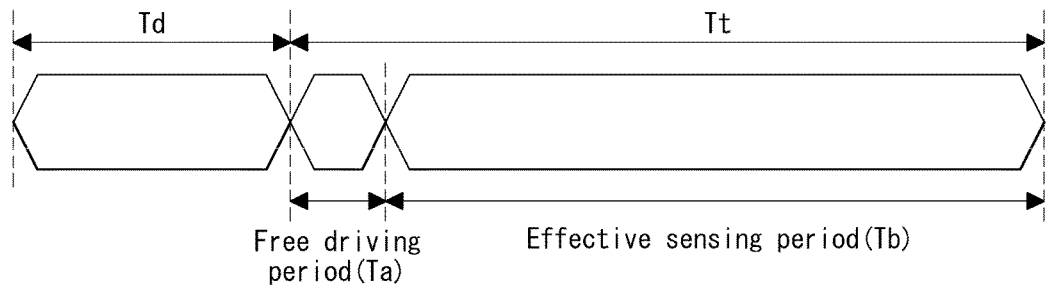
FIG. 15 is a waveform diagram showing that a touch period includes a free driving period and an effective sensing period following the free driving period.
Figure 16:
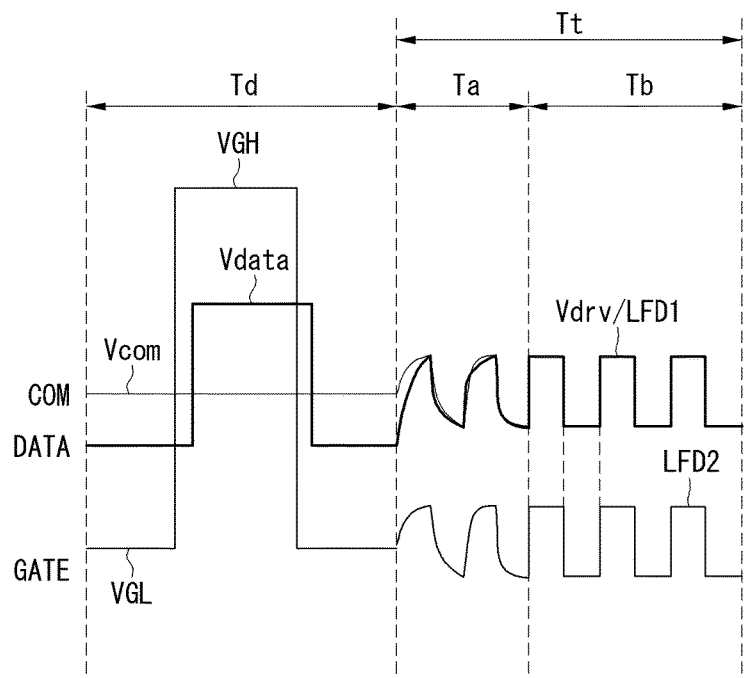
FIG. 16 is a waveform diagram showing synchronization of phases and amplitudes of a touch driving signal and an AC signal going through a free driving period.
Figure 17A:
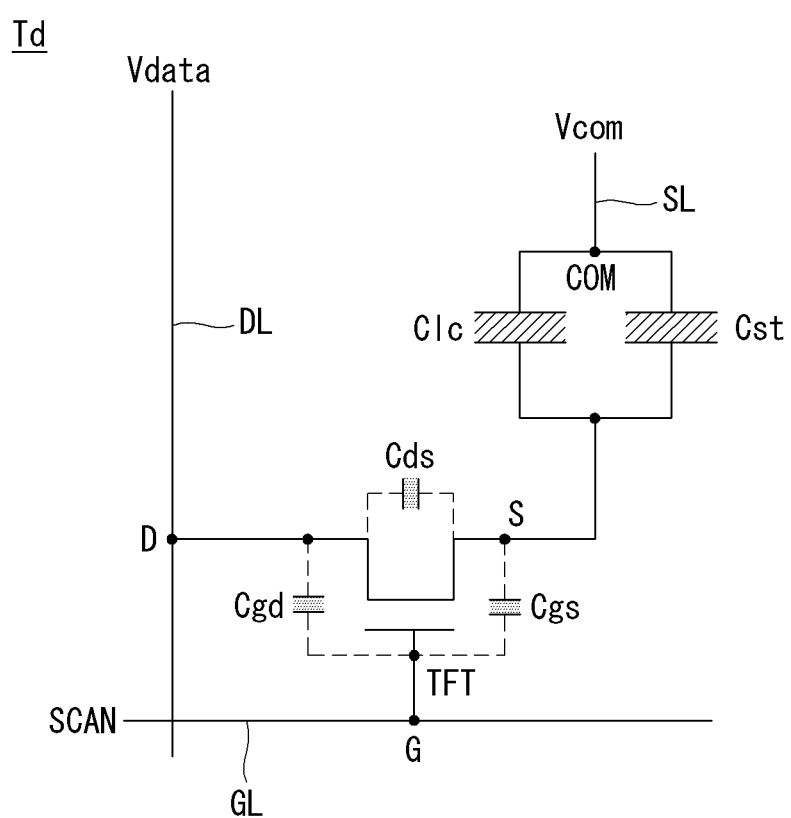
FIGS. 17A, 17B, and 17C are circuit diagrams showing changes in a parasitic capacitance affecting an operation of a thin-film transistor (TFT) of a pixel in each of a display period, a free driving period, and an effective sensing period of FIG. 16.
Figure 17B:
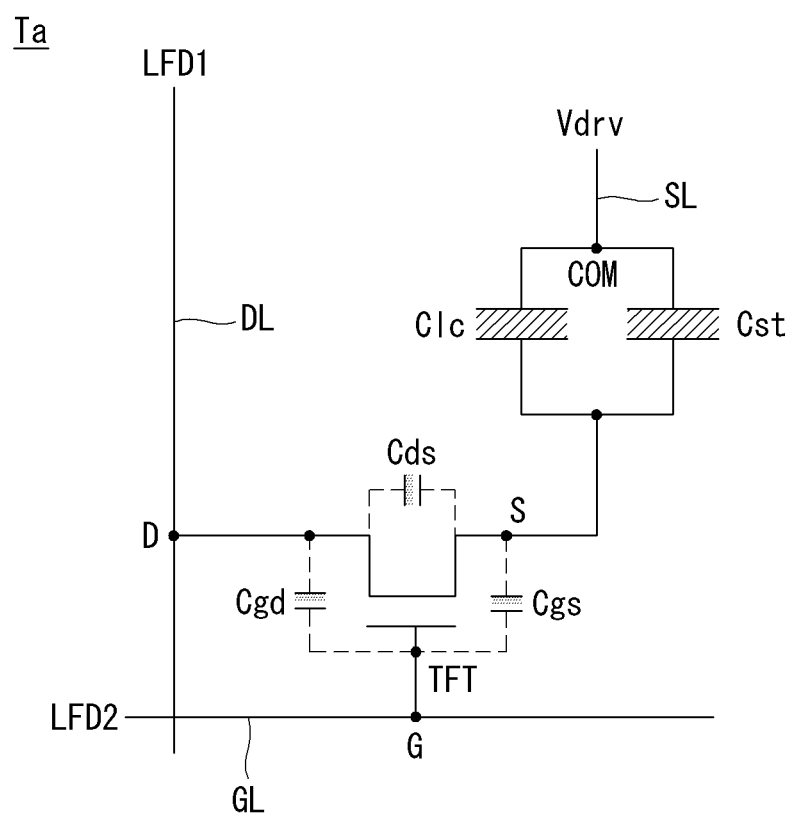
Figure 17C:
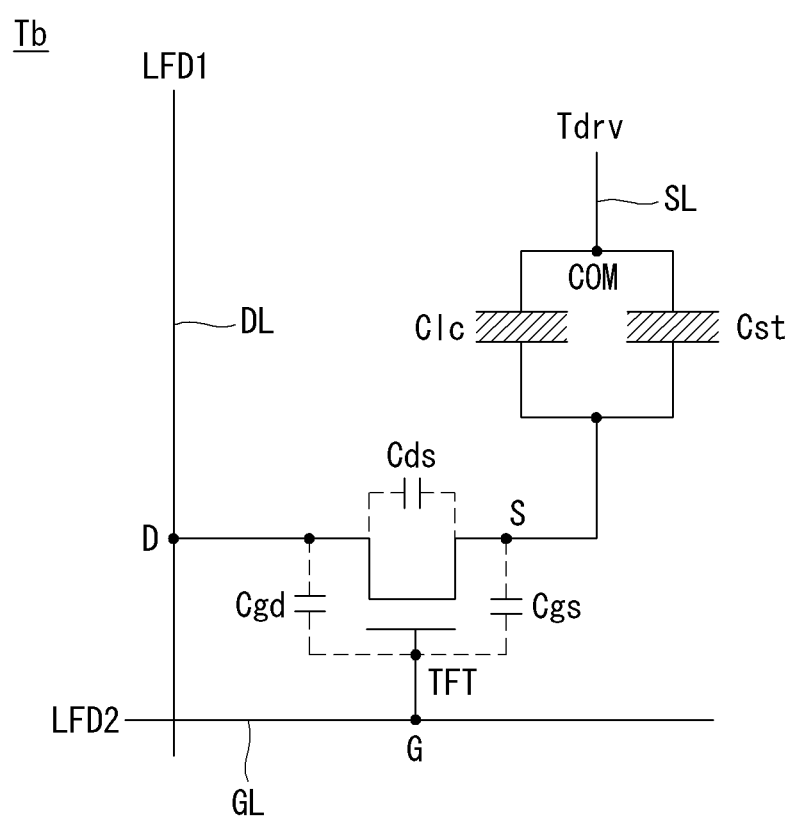

FIG. 14 is a flow diagram showing that a touch period includes a free driving period and an effective sensing period following the free driving period. FIG. 15 is a waveform diagram showing that a touch period includes a free driving period and an effective sensing period following the free driving period. FIG. 16 is a waveform diagram showing synchronization of phases and amplitudes of a touch driving signal and an AC signal going through a free driving period. FIGS. 17A, 17B, and 17C are circuit diagrams showing changes in a parasitic capacitance affecting an operation of a TFT of a pixel in each of a display period, a free driving period, and an effective sensing period of FIG. 16.

With reference to FIGS. 14 and 15, the touch period Tt according to an embodiment may include a free driving period Ta, in which the touch driving signal Vdrv may be applied prior to the touch sensing, and an effective sensing period Tb, in which the touch input may be sensed based on the touch driving signal Vdrv. The free driving period Ta may be between the display period Td and the effective sensing period Tb. During the free driving period Ta, parasitic capacitances, which may have been accumulated on parasitic capacitors of the TFTs of the pixels during the display period Td, may be discharged. If the touch sensing is performed in a state where the parasitic capacitances are not sufficiently discharged, accuracy of the touch sensing may be reduced. Therefore, an embodiment can secure a discharge time of the parasitic capacitances through the free driving period Ta. During the free driving period Ta, the touch driving signal Vdry may be applied to the touch line so that the parasitic capacitances are easily discharged. However, the sensing unit SU may be maintained in a standby state during the free driving period Ta, and may not sense the touch input. The sensing unit SU may start to sense the touch input in the effective sensing period Tb after the parasitic capacitances are completely discharged during the free driving period Ta. This is described in detail below with reference to the examples of FIGS. 16 to 17C.

With reference to the FIGS. 16 and 17A examples, the TFT of the pixel may be turned on in the display period Td, and a liquid crystal capacitor Clc and a storage capacitor Cst of the pixel may be charged with the data voltage. In the display period Td, a first parasitic capacitance Cgs existing between a gate and a source of the TFT, a second parasitic capacitance Cgd existing between the gate and a drain of the TFT, and a third parasitic capacitance Cds existing between the source and the drain of the TFT may also be charged.

With reference to the FIGS. 16 and 17B examples, the TFT of the pixel may be turned off in the free driving period Ta, and the liquid crystal capacitor Clc and the storage capacitor Cst of the pixel may hold the charged data voltage. In the free driving period Ta, remaining charges may exist in the first to third parasitic capacitances Cgs, Cgd, and Cds of the TFT and may be naturally discharged after time has passed. In the free driving period Ta, when the touch driving signal Vdrv is applied to the touch sensors connected to an electrode at one side of the liquid crystal capacitor Clc and an electrode at one side of the storage capacitor Cst, the natural discharge may be performed more smoothly.

With reference to the FIGS. 16 and 17C example, the TFT of the pixel maintains a turn-off state in the effective sensing period Tb, and the liquid crystal capacitor Clc and the storage capacitor Cst of the pixel may hold the charged data voltage. In the effective sensing period Tb, the first to third parasitic capacitances Cgs, Cgd, and Cds of the TFT may maintain a natural discharge state.

Figure 18:
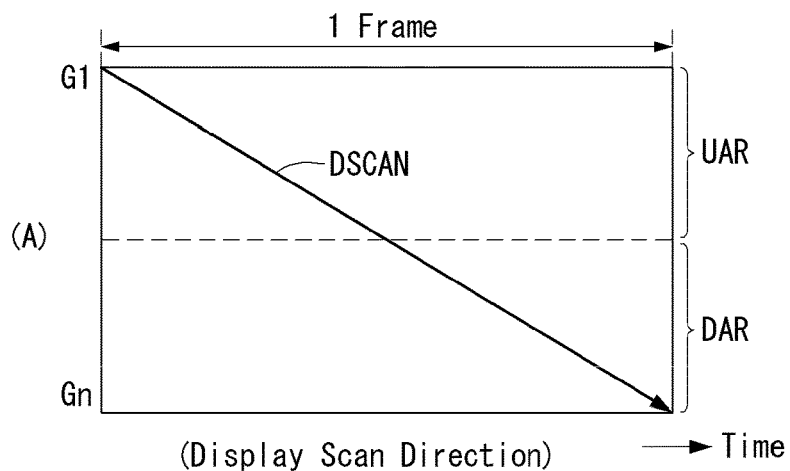
FIG. 18 is a set of graphs illustrating a display scan direction and a touch scan direction according to another example embodiment of the disclosure.
Figure 18:
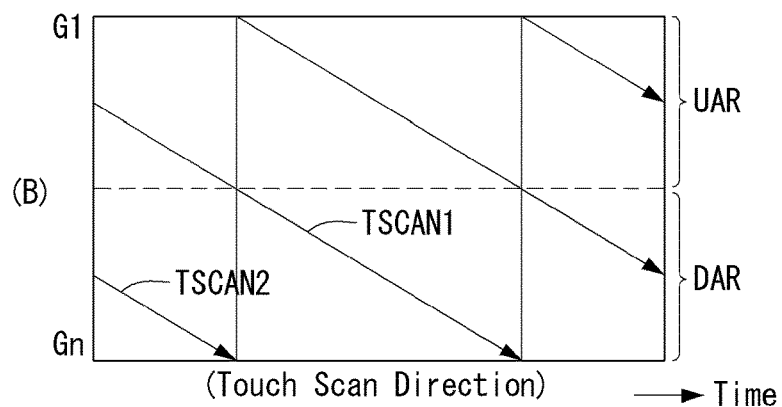
Figure 18:
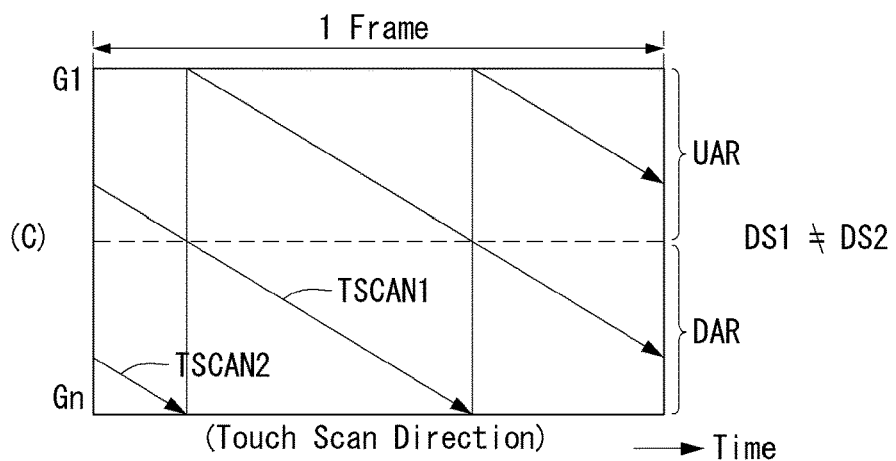
Figure 19A:
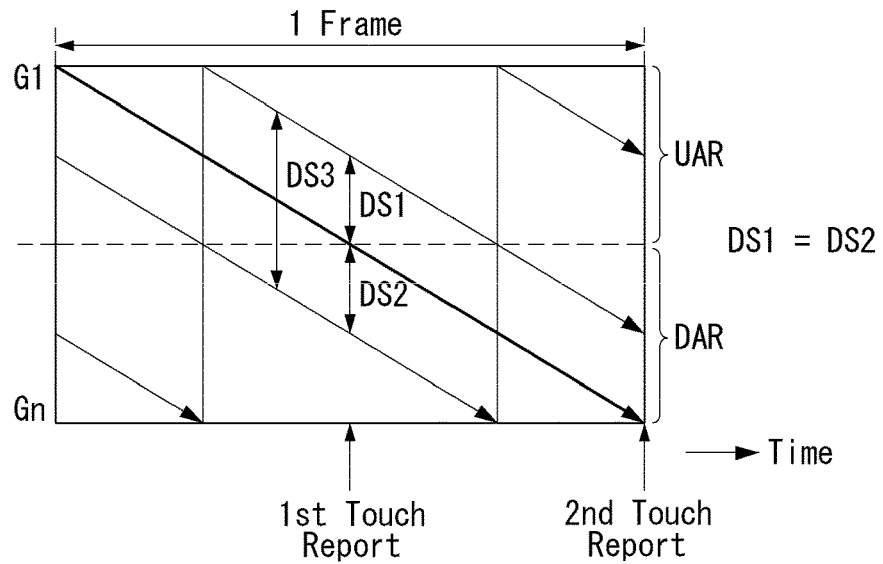
FIGS. 19A and 19B are graphs showing that a touch report rate increases by touch-scanning all touch lines two times in one frame period.
Figure 19B:
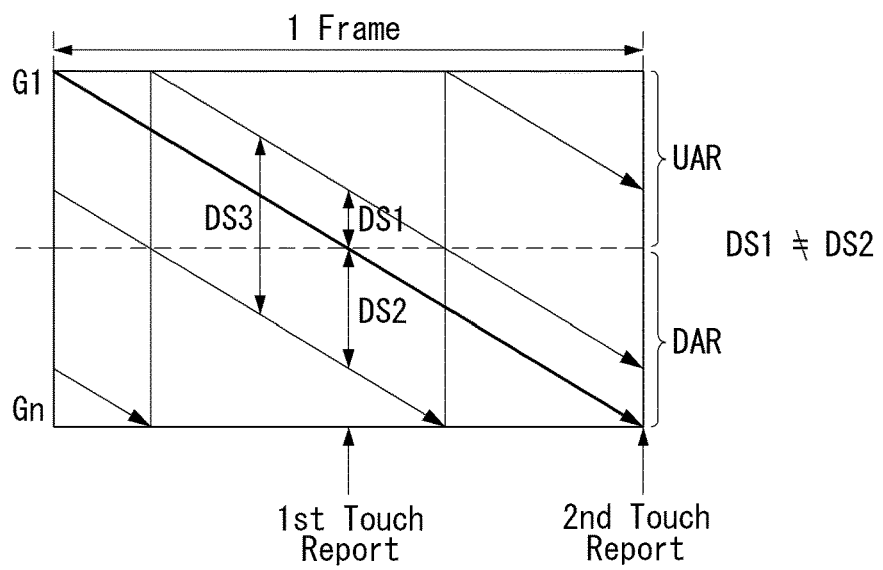
Figure 20:
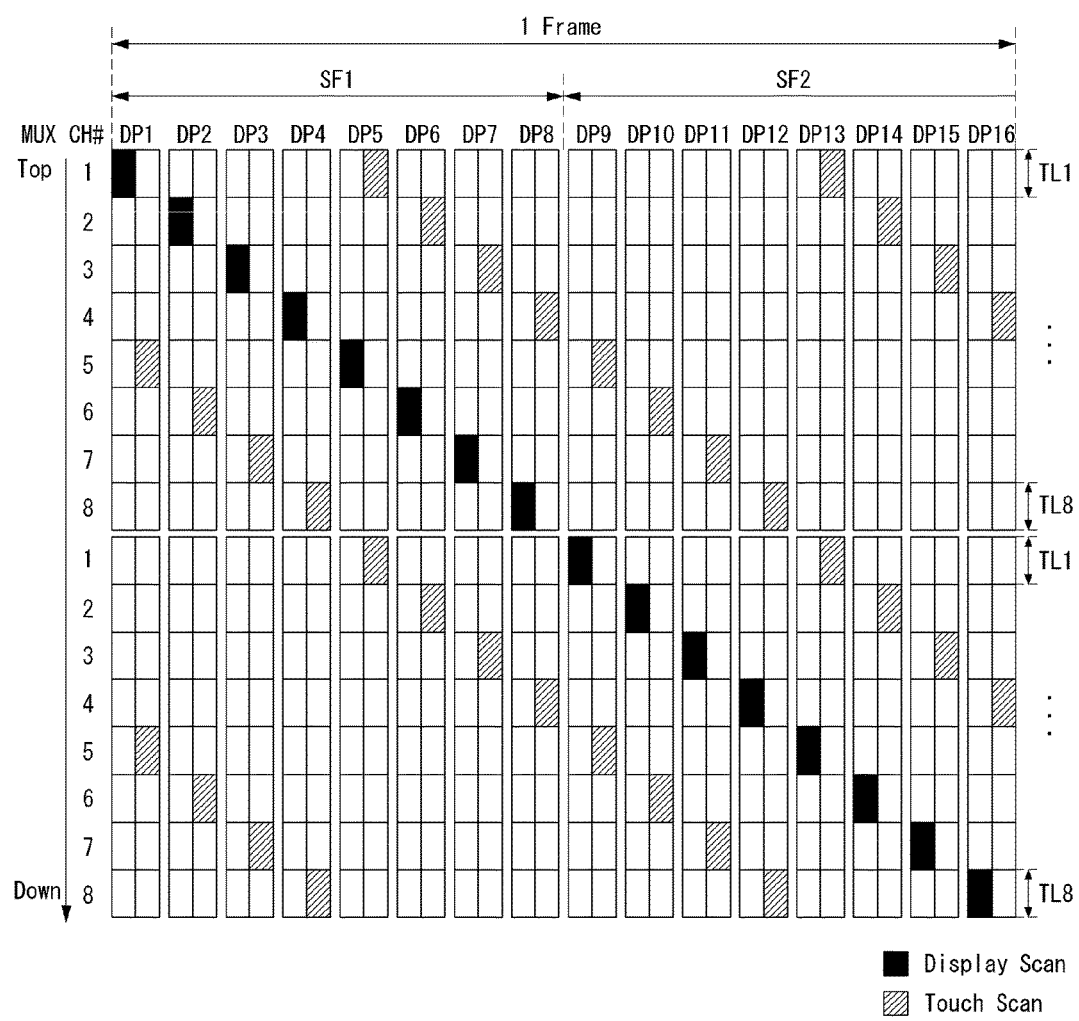
FIGS. 20 and 21 are schematic flow diagrams showing a display scan, which is sequentially performed based on one display line in one direction of a display panel, and a touch scan direction, which is sequentially and simultaneously performed every two touch lines in the same direction as the display scan, so as to output a touch report two times in one frame period.
Figure 21:
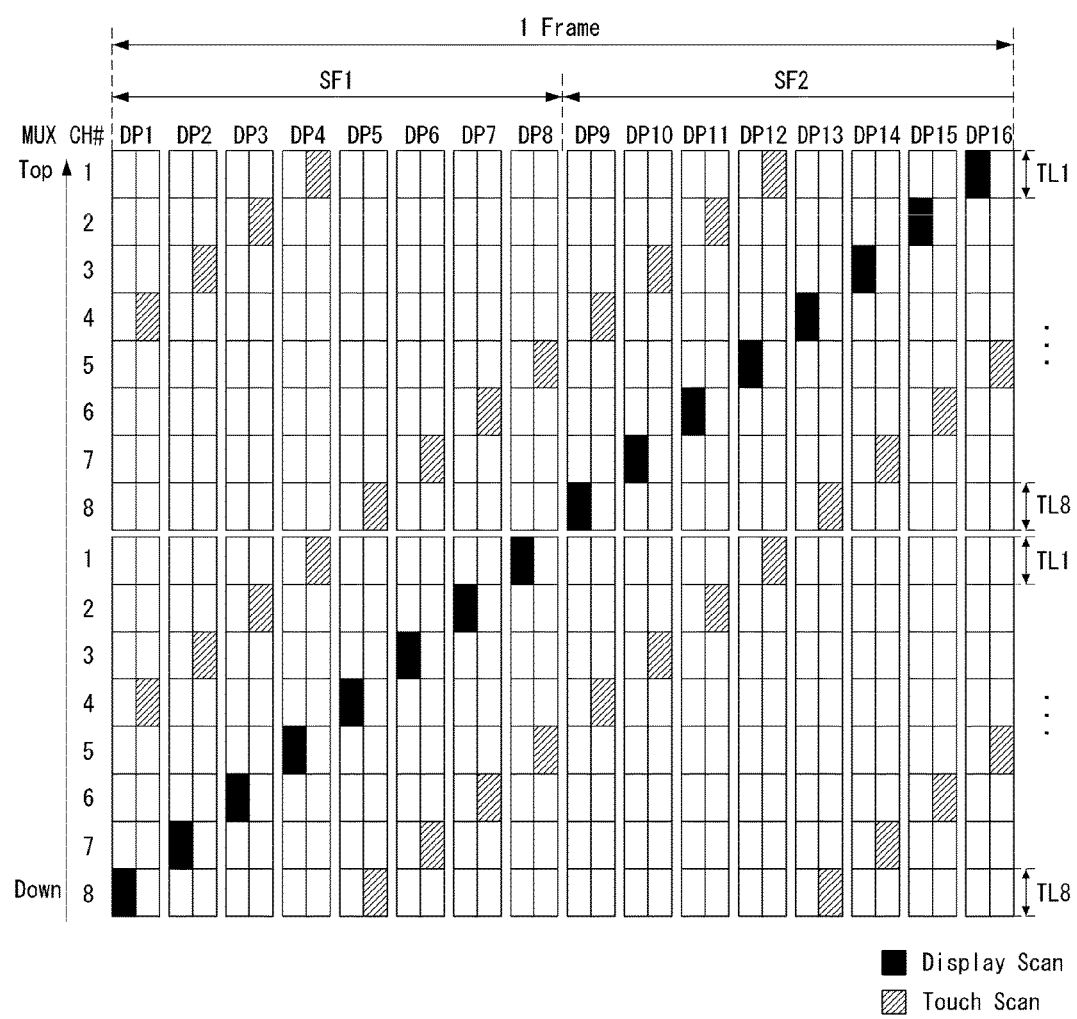
Figure 22:
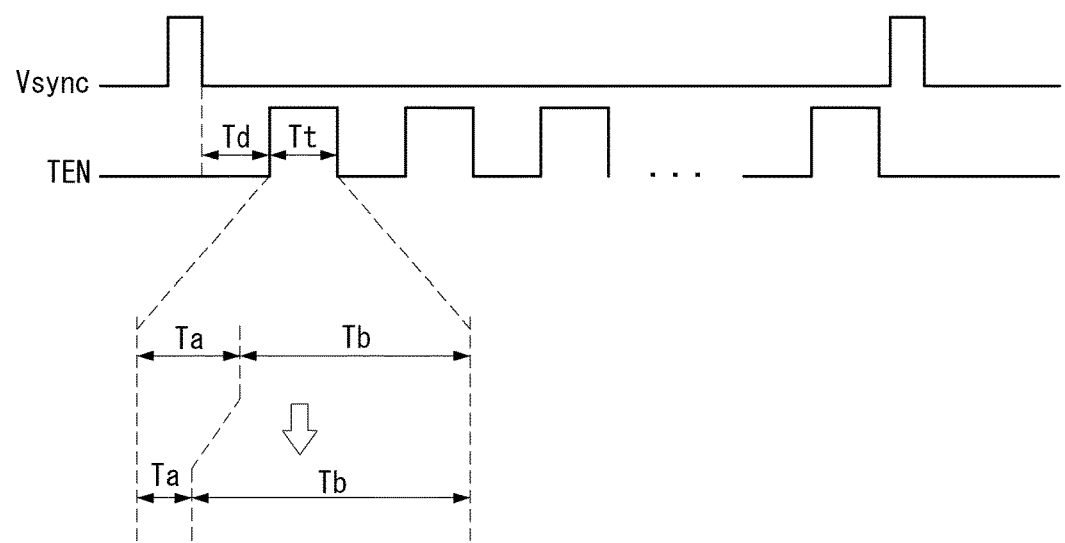
FIG. 22 is a waveform diagram showing a reduction in a length of a free driving period in a touch period according to another example embodiment.

FIGS. 18 to 22 illustrate a method for minimizing a difference between parasitic capacitances of first and second touch lines while increasing a touch report rate in a display device according to another embodiment of the disclosure. FIG. 18 is a set of graphs illustrating a display scan direction and a touch scan direction according to another example embodiment of the disclosure. FIGS. 19A and 19B are graphs showing that a touch report rate increases by touch-scanning all touch lines two times in one frame period. FIGS. 20 and 21 are schematic flow diagrams showing a display scan, which is sequentially performed based on one display line in one direction of a display panel, and a touch scan direction, which is sequentially and simultaneously performed every two touch lines in the same direction as the display scan, so as to output a touch report two times in one frame period. FIG. 22 is a waveform diagram showing a reduction in a length of a free driving period in a touch period according to another example embodiment.

With reference to the examples of FIGS. 18 to 22, another embodiment of the disclosure may perform a touch scan two times while a display scan is performed once during one frame period, and may also parallelize an extension line of a display scan direction DSCAN and extension lines of touch scan directions TSCAN1 and TSCAN2 in the one frame period. For example, as shown in graph (A) of FIG. 18, an embodiment may sequentially perform the display scan in one direction of the display panel 10 based on one display line through display periods Td1 to TdN of one frame period. As shown in graphs (B) and (C) of FIG. 18, an embodiment may sequentially perform the touch scan in the same direction as the display scan through touch periods Tt1 to TtN of one frame period. In one example, an embodiment may simultaneously perform the touch scan every two touch lines. As a result, as shown in FIGS. 19A and 19B, a first area AR1 of the display panel 10, which is display-scanned, and a first touch line TLa, which is touch-scanned, may not overlap each other in one frame period. Further, the first area AR1 does not overlap a second touch line TLb, which may be touch-scanned at the same time as the first touch line TLa.

As shown in the examples of FIGS. 19A and 19B, a first separation distance DS1 between the first area AR1 and the first touch line TLa, a second separation distance DS2 between the first area AR1 and the second touch line TLb, and a third separation distance DS3 between the first touch line TLa and the second touch line TLb may be held constant in one frame period.

Because one of the first touch line TLa and the second touch line TLb, which are simultaneously touch-scanned, may overlap the display-scanned first area AR1 immediately before the touch scan of the touch line, a difference between parasitic capacitances of the first touch line TLa and the second touch line TLb may occur. Thus, an embodiment may have to increase a length of a free driving period Ta to minimize the parasitic capacitance difference. However, this may lead to a reduction in a length of an effective sensing period Tb.

On the other hand, an embodiment may cause the extension lines of the touch scan directions to be parallel to the extension line of the display scan direction, and may perform the touch scan at the same location as a performance location of the display scan after a predetermined period of time has passed from a performance time point of the display scan. Hence, as shown in the FIG. 22 example, an embodiment can efficiently reduce the length of the free driving period Ta in a fixed length of the touch period Tt. As a result, an embodiment can increase the length of the effective sensing period Tb and can increase the sensitivity of the touch sensing.

As shown in the FIG. 19A example, an embodiment may cause the first separation distance DS1 to be the same as the second separation distance DS2 at one half of one frame period. When the first separation distance DS1 is the same as the second separation distance DS2 as described above, the difference between the parasitic capacitances of the first touch line TLa and the second touch line TLb may be minimized.

As shown in the FIG. 19B example, an embodiment may cause the first separation distance DS1 to be different from the second separation distance DS2 at one half of one frame period. Although the first separation distance DS1 may be different from the second separation distance DS2 as described above, an embodiment may perform the touch scan at the same location as a performance location of the display scan after a predetermined period of time has passed from a performance time point of the display scan. Hence, the difference between the parasitic capacitances of the first touch line TLa and the second touch line TLb may be reduced.

In the examples of FIGS. 19A and 19B, a touch report may be output two times in one frame period. As a detailed example of FIG. 19A, in one embodiment, as shown in the FIG. 20 example, one frame period may include a first subframe SF1 including first to eighth driving periods DP1 to DP8 and a second subframe SF2 including ninth to sixteenth driving periods DP9 to DP16.

An embodiment may sequentially perform the display scan of an area 1 corresponding to 1/N of the display panel 10 based on one display line during a display period Td1 of the first driving period DP1. Subsequently, an embodiment may simultaneously perform the touch scan of an area (e.g., a fifth touch line TL5 of an upper display surface UAR and a fifth touch line TL5 of a lower display surface DAR) corresponding to 2/N of the display panel 10 during a touch period Tt1 of the first driving period DP1. In one example, the area 1 may be separated from the fifth touch line TL5 of each of the upper display surface UAR and the lower display surface DAR, so that the parasitic capacitance difference may be minimized. An embodiment may sequentially perform the display scan of an area 2 corresponding to 1/N of the display panel 10 based on one display line during a display period Td2 of the second driving period DP2. Subsequently, an embodiment may simultaneously perform the touch scan of an area (e.g., a six touch line TL6 of the upper display surface UAR and a six touch line TL6 of the lower display surface DAR) corresponding to 2/N of the display panel 10 during a touch period Tt2 of the second driving period DP2. In one example, the area 2 may be separated from the six touch line TL6 of each of the upper display surface UAR and the lower display surface DAR, so that the parasitic capacitance difference may be minimized. Further, an embodiment may sequentially perform the display scan of an area 8 corresponding to 1/N of the display panel 10 based on one display line during a display period Td8 of the eighth driving period DP8. Subsequently, an embodiment may simultaneously perform the touch scan of an area (e.g., a fourth touch line TL4 of the upper display surface UAR and a fourth touch line TL4 of the lower display surface DAR) corresponding to 2/N of the display panel 10 during a touch period Tt8 of the eighth driving period DP8. In one example, the area 8 may be separated from the fourth touch line TL4 of each of the upper display surface UAR and the lower display surface DAR, so that the parasitic capacitance difference may be minimized. Through the above-described method, an embodiment may perform the touch scan of all of the touch lines of the display panel 10 in the first subframe SF1, in which the display scan of the upper display surface UAR is performed, thereby outputting a first touch report.

An embodiment may sequentially perform the display scan of an area 9 corresponding to 1/N of the display panel 10 based on one display line during a display period Td9 of the ninth driving period DP9. Subsequently, an embodiment may simultaneously perform the touch scan of an area (e.g., the fifth touch line TL5 of the upper display surface UAR and the fifth touch line TL5 of the lower display surface DAR) corresponding to 2/N of the display panel 10 during a touch period Tt9 of the ninth driving period DP9. In one example, the area 9 may be separated from the fifth touch line TL5 of each of the upper display surface UAR and the lower display surface DAR, so that the parasitic capacitance difference may be minimized. An embodiment may sequentially perform the display scan of an area 10 corresponding to 1/N of the display panel 10 based on one display line during a display period Td10 of the tenth driving period DP10. Subsequently, an embodiment may simultaneously perform the touch scan of an area (e.g., the six touch line TL6 of the upper display surface UAR and the six touch line TL6 of the lower display surface DAR) corresponding to 2/N of the display panel 10 during a touch period Tt10 of the tenth driving period DP10. In one example, the area 10 may be separated from the six touch line TL6 of each of the upper display surface UAR and the lower display surface DAR, so that the parasitic capacitance difference may be minimized. Further, an embodiment may sequentially perform the display scan of an area 16 corresponding to 1/N of the display panel 10 based on one display line during a display period Td16 of the sixteenth driving period DP16. Subsequently, an embodiment may simultaneously perform the touch scan of an area (e.g., the fourth touch line TL4 of the upper display surface UAR and the fourth touch line TL4 of the lower display surface DAR) corresponding to 2/N of the display panel 10 during a touch period Tt16 of the sixteenth driving period DP16. In one example, the area 16 may be separated from the fourth touch line TL4 of each of the upper display surface UAR and the lower display surface DAR, so that the parasitic capacitance difference may be minimized. Through the above-described method, an embodiment may perform the touch scan of all of the touch lines of the display panel 10 in the second subframe SF2, in which the display scan of the lower display surface DAR is performed, thereby outputting a second touch report.

The FIG. 21 example is different from the FIG. 20 example in the display scan direction DSCAN and the touch scan directions TSCAN1 and TSCAN2. The configuration of FIG. 21 has a substantially similar effect as the effect described above with reference to FIG. 20.

Figure 23:
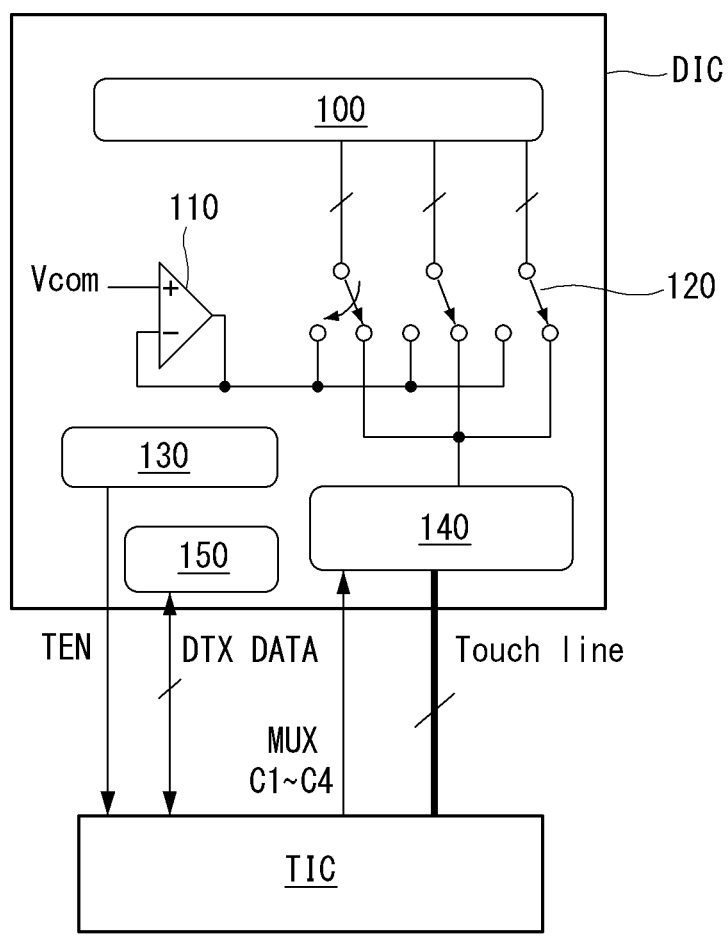
FIGS. 23 to 25 are circuit diagrams showing various examples of a touch sensor driver according to an example embodiment.
Figure 24:
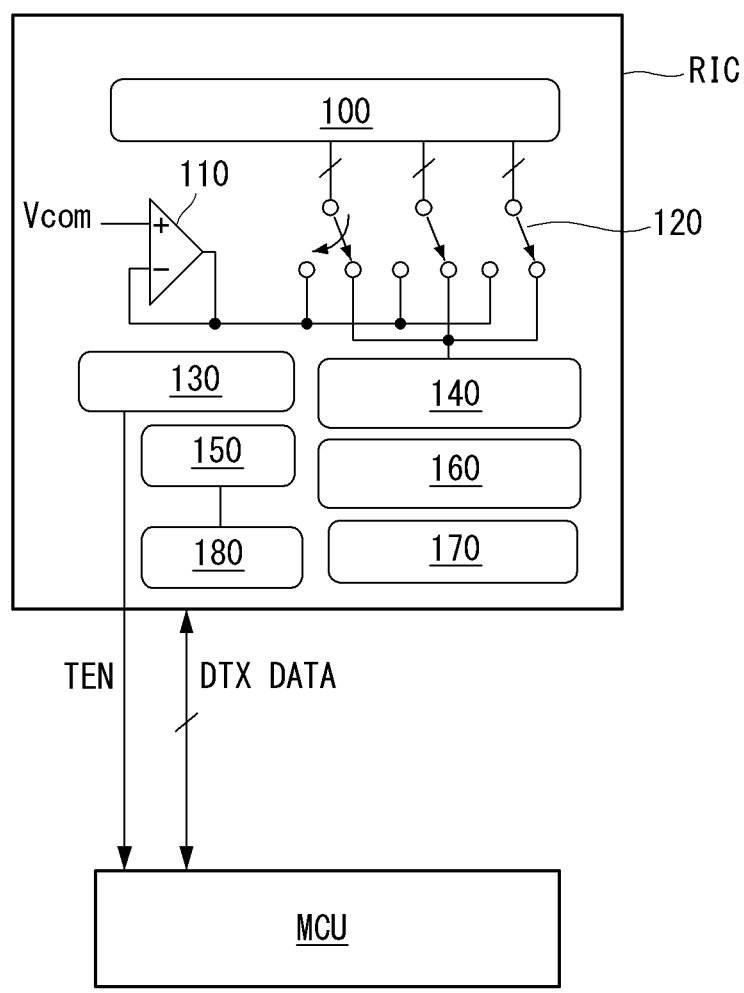
Figure 25:
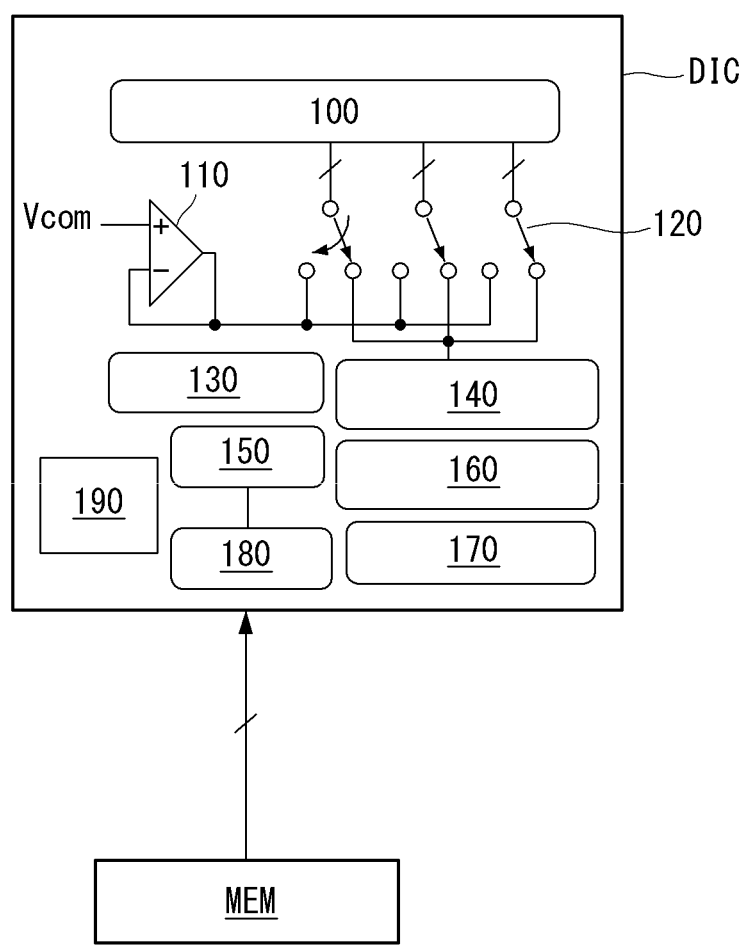

FIGS. 23 to 25 are circuit diagrams showing various examples of the touch sensor driver 18 according to an embodiment of the disclosure. The touch sensor driver 18 according to an embodiment may be implemented as an IC package, as shown in the examples of FIGS. 23 to 25.

With reference to the FIG. 23 example, the touch sensor driver 18 may include a driver IC DIC and a touch sensing IC TIC. The driver IC DIC may include a touch sensor channel unit 100, a Vcom buffer 110, a switch array 120, a timing control signal generator 130, a multiplexer (MUX) 140, and a DTX compensation unit 150.

The touch sensor channel unit 100 may be connected to electrodes of the touch sensors through the sensor lines, and may be connected to the Vcom buffer 110 and the multiplexer 140 through the switch array 120. The multiplexer 140 may connect the sensor lines to the touch sensing IC TIC. In case of a 1-to-3 multiplexer, the multiplexer 140 may sequentially connect one channel of the touch sensing IC TIC to the three sensor lines in the time-division manner, and thus may reduce the number of channels of the touch sensing IC TIC. The multiplexer 140 may sequentially select the sensor lines, which may be connected to the channel of the touch sensing IC TIC, in response to MUX control signals MUXC1 to MUXC3. The multiplexer 140 may be connected to the channels of the touch sensing IC TIC through touch lines.

The Vcom buffer 110 may output the common voltage Vcom of the pixel. The switch array 120 may supply the common voltage Vcom output from the Vcom buffer 110 to the touch sensor channel unit 100 during the display period under the control of the timing control signal generator 130. The switch array 120 may connect the sensor lines to the touch sensing IC TIC during the touch period under the control of the timing control signal generator 130.

The timing control signal generator 130 may generate timing control signals for controlling operation timings of the display driver and the touch sensing IC TIC. With reference to FIGS. 23 and 1 (above), the display driver may include a data driver 12 for applying data of an input image to the pixels and a gate driver 14. The data driver 12 may generate a data voltage, and may supply the data voltage to data lines D1 to Dm of the display panel 10. The data driver 12 may be integrated into the driver IC DIC. The gate driver 14 may sequentially supply a gate pulse (or a scan pulse) synchronized with the data voltage to gate lines G1 to Gn of the display panel 10. The gate driver 14 may be disposed on a substrate of the display panel 10 along with the pixels.

The timing control signal generator 130 of the driver IC DIC may be substantially the same as a timing control signal generator present in the timing controller 16 shown in FIG. 1. The timing control signal generator 130 may drive the display driver during the display period, and may drive the touch sensing IC TIC during the touch period.

The timing control signal generator 130 may produce the touch enable signal TEN defining the display period and the touch period, and may synchronize the display driver with the touch sensing IC TIC. The display driver may apply data to the pixels during a first level period of the touch enable signal TEN. The touch sensing IC TIC may drive the touch sensors in response to a second level of the touch enable signal TEN, and may sense the touch input.

The touch sensing IC TIC may be connected to a driving power unit (not shown), and may receive driving power. The touch sensing IC TIC may produce the touch sensor driving signal in response to the second level of the touch enable signal TEN, and may apply the touch sensor driving signal to the touch sensors. The touch sensor driving signal may be generated in various pulse shapes, e.g., a square wave, a sine wave, a triangle wave, and the like. In one example, the touch sensor driving signal may be generated in the pulse shape of the square wave. The touch sensor driving signal may be applied to each of the touch sensors N times, so that charges may be accumulated on an integrator of the touch sensing IC TIC N or more times, where N is a natural number equal to or greater than 2.

A noise of the touch sensor driving signal may increase depending on changes in data of the input image. The DTX compensation unit 150 may analyze the data of the input image, may remove a noise component from touch raw data depending on changes in a gray level of the input image, and may transmit it to the touch sensing IC TIC. "DTX" means Display and Touch crosstalk. In case of a system, in which a noise of the touch sensor does not sensitively change depending on changes in data of the input image, the DTX compensation unit 150 may be omitted. In FIG. 23, "DTX DATA" is output data of the DTX compensation unit 150.

Details of the DTX compensation unit 150 are disclosed in Korean Patent Application No. 10-2012-0149028, filed on Dec. 19, 2012, which corresponds to U.S. Patent Application Publication No. 2015/0286339, entitled "Display Device and Touch Sensing Method Thereof," published on Oct. 8, 2015. Both of these references are co-owned by the present Applicant, LG Display Co., Ltd., and each of which is hereby incorporated by reference in its entirety.

The touch sensing IC TIC may drive the multiplexer 140 in response to the touch enable signal TEN from the timing control signal generator 130 during the touch period, and may receive charges of the touch sensors through the multiplexer 140 and the sensor lines.

The touch sensing IC TIC may detect a change in charges before and after the touch input from the touch sensor driving signal, and may compare the change in charges with a predetermined threshold value. The touch sensing IC TIC may determine a location of the touch sensors having the change in charges, equal to or greater than the threshold value, as an area of the touch input. The touch sensing IC TIC may calculate coordinates of each touch input, and may transmit touch data TDATA(XY), including coordinate information of the touch input, to the external host system 19. The touch sensing IC TIC may include an amplifier for amplifying charges of the touch sensor, an integrator for accumulating charges received from the touch sensor, an analog-to-digital converter (ADC) for converting a voltage of the integrator into digital data, and an arithmetic logic unit.

The arithmetic logic unit may compare touch raw data output from the ADC with the threshold value, and may determine the touch input based on the result of a comparison. The arithmetic logic unit may perform a touch recognition algorithm for calculating coordinates. The driver IC DIC and the touch sensing IC TIC may transmit and receive signals through a serial peripheral interface (SPI) or a bus low-voltage differential signaling (BLVDS) interface.

The "host system" 19 means a system main body of an electronic device, to which the display device according to an embodiment is applicable. The host system 19 may be implemented, for example, as one of a phone system, a television system, a set-top box, a navigation system, a DVD player, a Blu-ray player, a personal computer (PC), and a home theater system. The host system 19 may receive touch input data TDATA(XY) from the touch sensing IC TIC, and may execute an application associated with the touch input.

With reference to the example of FIG. 24, the touch sensor driver 18 may include a readout IC RIC and a microcontroller unit (MCU). The readout IC MC may include a touch sensor channel unit 100, a Vcom buffer 110, a switch array 120, a first timing control signal generator 130, a multiplexer (MUX) 140, a DTX compensation unit 150, a sensing unit 160, a second timing control signal generator 170, and a memory 180. The readout IC MC shown in the FIG. 24 example is different from the driver IC DIC shown in the FIG. 23 example in that the sensing unit 160 and the second timing control signal generator 170 are integrated inside the readout IC MC. The first timing control signal generator 130 of the FIG. 24 example may be substantially the same as the timing control signal generator 130 of the FIG. 23 example. Thus, the first timing control signal generator 130 may generate timing control signals for controlling operation timings of the display driver and the readout IC MC.

The multiplexer 140 may float electrodes of the touch sensor accessed by the sensing unit 160 under the control of the MCU. The touch sensor electrodes accessed by the sensing unit 160 may be selected by the sensing unit 160 among other touch sensor electrodes other than the touch sensor electrodes connected to the pixels charged to the data voltage. The multiplexer 140 may supply the common voltage Vcom under the control of the MCU.

The sensing unit 160 may be connected to the sensor lines through the multiplexer 140. The sensing unit 160 may measure a change in a waveform of the voltage received from the touch sensors, and may convert the change into digital data. The sensing unit 160 may include an amplifier for amplifying the received voltages of the touch sensor electrodes 22, an integrator for accumulating the amplified voltages of the amplifier, and an analog-to-digital converter (ADC) for converting a voltage of the integrator into digital data. The digital data output from the ADC is touch raw data TDATA, and may be transmitted to the MCU.

The second timing control signal generator 170 may generate timing control signals and clock signals for controlling operation timings of the multiplexer 140 and the sensing unit 160. The DTX compensation unit 150 may be omitted in the readout IC RIC. The memory 180 may temporarily store the touch raw data TDATA under the control of the second timing control signal generator 170.

The readout IC MC and the MCU may transmit and receive signals through a serial peripheral interface (SPI) or a bus low-voltage differential signaling (BLVDS) interface. The MCU may compare the touch raw data TDATA with a predetermined threshold value, and may determine a touch input based on the result of a comparison. The MCU may perform a touch recognition algorithm calculating coordinates.

With reference to FIG. 25, the touch sensor driver 18 may include a driver IC DIC and a memory MEM. The driver IC DIC may include a touch sensor channel unit 100, a Vcom buffer 110, a switch array 120, a first timing control signal generator 130, a multiplexer 140, a DTX compensation unit 150, a sensing unit 160, a second timing control signal generator 170, a memory 180, and a MCU 190. The driver IC DIC shown in the FIG. 25 example is different from the readout IC MC shown in the FIG. 24 example in that the MCU 190 is integrated inside the driver IC DIC. The MCU 190 may compare touch raw data TDATA with a predetermined threshold value, and may determine a touch input based on the result of a comparison. The MCU 190 may perform a touch recognition algorithm calculating coordinates.

The memory MEM may store a register setting value related to timing information required in operations of the display driver and the sensing unit 160. When the display device 10 is powered on, the register setting value may be loaded from the memory MEM to the first timing control signal generator 130 and the second timing control signal generator 170. The first timing control signal generator 130 and the second timing control signal generator 170 may generate timing control signals for controlling the display driver and the sensing unit 160 based on the register setting value read from the memory MEM. An embodiment can respond to changes in a model of a driving device without a change in a structure of the driving device by changing the register setting value of the memory MEM.

As described above, an embodiment can increase the touch sensitivity without reducing the display quality of the input image by outputting the touch report two times in one frame period using the double feeding method. Furthermore, an embodiment may cause the extension lines of the touch scan directions to be parallel to the extension line of the display scan direction, and may perform the touch scan at the same location as a performance location of the display scan after a predetermined period of time has passed from a performance time point of the display scan. Hence, an embodiment may minimize the difference between the parasitic capacitances of two touch lines which are simultaneously touch-scanned. As a result, an embodiment can efficiently reduce the length of the free driving period in a fixed length of the touch period, and can increase the length of the effective sensing period, thereby greatly increasing the sensitivity of the touch sensing.

It will be apparent to those skilled in the art that various modifications and variations can be made in the present disclosure without departing from the spirit or scope of the invention. Thus, it is intended that embodiments of the present disclosure cover the modifications and variations of this invention provided they come within the scope of the appended claims and their equivalents.

What is claimed is:

1. A touch sensor embedded display device, comprising:
   a display panel comprising pixels and touch sensors;
   a display driver configured to sequentially:
      perform a display scan of a first area of the display panel based on one display line in a display period; and
      apply data of an input image to the pixels of the first area in the display period; and
   a touch sensor driver configured to:
      perform a touch scan of a first touch line of the display panel and a touch scan of a second touch line of the display panel, simultaneously, in a touch period following the display period, a same scan driving signal being applied to both the first touch line and the second touch line of the display panel for an entire touch scan period; and
      sense touch inputs of the touch sensors on the first and second touch lines, simultaneously, in the touch period,
   wherein each of the first and second touch lines overlaps a plurality of display lines, and
   wherein a width of each of the first and second touch lines is greater than a width of each of the plurality of display lines.

2. The touch sensor embedded display device of claim 1, wherein:
   the display panel comprises an upper display surface and a lower display surface;
   the first touch line is on the upper display surface; and
   the second touch line is on the lower display surface.

3. The touch sensor embedded display device of claim 2, wherein an extension line of a display scan direction and an extension line of a touch scan direction cross each other in one frame period.

4. The touch sensor embedded display device of claim 3, wherein a time separation between the first touch line and the second touch line changes in the one frame period.

5. The touch sensor embedded display device of claim 4, wherein, when the one frame period comprises a first subframe and a second subframe which are successively arranged, the time separation has:
   a maximum value at a start time point of each of the first subframe and the second subframe; and
   a minimum value at an end time point of each of the first subframe and the second subframe.

6. The touch sensor embedded display device of claim 5, wherein the first area and the first touch line overlap each other in the first subframe.

7. The touch sensor embedded display device of claim 4, wherein, when the one frame period comprises a first subframe and a second subframe which are successively arranged, the time separation has:
   a minimum value at a start time point of each of the first subframe and the second subframe; and
   a maximum value at an end time point of each of the first subframe and the second subframe.

8. The touch sensor embedded display device of claim 7, wherein the first area and the second touch line overlap each other in the second subframe.

9. The touch sensor embedded display device of claim 2, wherein an extension line of a display scan direction and an extension line of a touch scan direction are at a same time separation to each other during one frame period.

10. The touch sensor embedded display device of claim 9, wherein the first area does not overlap the first touch line and the second touch line in the one frame period.

11. The touch sensor embedded display device of claim 10, wherein:
   a first time separation between operation of a first display line and operation of the first touch line, a second time separation between operation of the first display line and operation of the second touch line, and a third time separation between operation of the first touch line and operation of the second touch line are held constant in the one frame period; and the display scan for the first area is performed on the first display line.

12. The touch sensor embedded display device of claim 11, wherein the first time separation and the second time separation are the same as each other at one half of the one frame period.

13. The touch sensor embedded display device of claim 11, wherein the first time separation and the second time separation are different from each other at one half of the one frame period.

14. The touch sensor embedded display device of claim 1, wherein the touch period comprises:
   a free driving period, in which a touch driving signal is applied prior to a touch sensing; and
   an effective sensing period, in which a touch input is sensed based on the touch driving signal.

15. The touch sensor embedded display device of claim 1, wherein, during the touch period, the display driver is further configured to:
   supply a first AC signal having a same phase and the same amplitude as a touch driving signal to data lines connected to the pixels; and
   supply a second AC signal having the same phase and the same amplitude as the touch driving signal to gate lines connected to the pixels.

16. A method for driving a touch sensor embedded display device comprising a display panel comprising pixels and touch sensors, the method comprising:
   sequentially:
      performing a display scan of a first area of the display panel based on one display line in a display period; and
      applying data of an input image to the pixels of the first area in the display period;
      performing a touch scan of a first touch line of the display panel and a touch scan of a second touch line of the display panel, simultaneously, in a touch period following the display period, a same scan driving signal being applied to both the first touch line and the second touch line of the display panel for an entire touch scan period; and
      sensing touch inputs of the touch sensors on the first and second touch lines, simultaneously, in the touch period,
   wherein each of the first and second touch lines overlaps a plurality of display lines, and
   wherein a width of each of the first and second touch lines is greater than a width of each of the plurality of display lines.

17. The method of claim 16, wherein:
   the display panel comprises an upper display surface and a lower display surface;
   the first touch line is on the upper display surface; and
   the second touch line is on the lower display surface.

18. The method of claim 17, wherein an extension line of a display scan direction and an extension line of a touch scan direction cross each other in one frame period.

19. The method of claim 18, wherein a time separation between the first touch line and the second touch line changes in the one frame period.

20. The method of claim 19, wherein, when the one frame period comprises a first subframe and a second subframe which are successively arranged, the time separation has:
   a maximum value at a start time point of each of the first subframe and the second subframe; and
   a minimum value at an end time point of each of the first subframe and the second subframe.

21. The method of claim 20, wherein the first area and the first touch line overlap each other in the first subframe.

22. The method of claim 19, wherein, when the one frame period comprises a first subframe and a second subframe which are successively arranged, the time separation has:
   a minimum value at a start time point of each of the first subframe and the second subframe; and
   a maximum value at an end time point of each of the first subframe and the second subframe.

23. The method of claim 22, wherein the first area and the second touch line overlap each other in the second subframe.

24. The method of claim 17, wherein an extension line of a display scan direction and an extension line of a first touch scan direction and an extension line of a second touch scan direction are at a same time separation to each other during one frame period.

25. The method of claim 24, wherein the first area does not overlap the first touch line and the second touch line in the one frame period.

26. The method of claim 25, wherein:
   a first time separation between operation of a first display line and operation of the first touch line, a second time separation between operation of the first display line and operation of the second touch line, and a third time separation between operation of the first touch line and operation of the second touch line are held constant in the one frame period; and
   the display scan for the first area is performed on the first display line.

27. The method of claim 26, wherein the first time separation and the second time separation are the same as each other at one half of the one frame period.

28. The method of claim 26, wherein the first time separation and the second time separation are different from each other at one half of the one frame period.

29. The method of claim 16, wherein the touch period comprises:
   a free driving period, in which a touch driving signal is applied prior to a touch sensing; and
   an effective sensing period, in which a touch input is sensed based on the touch driving signal.

30. The method of claim 16, further comprising:
   supplying a first AC signal having the same phase and the same amplitude as a touch driving signal to data lines connected to the pixels during the touch period; and
   supplying a second AC signal having the same phase and the same amplitude as the touch driving signal to gate lines connected to the pixels during the touch period.

* * * * *